(12) United States Patent
Kim et al.

(10) Patent No.: US 8,035,766 B2
(45) Date of Patent: Oct. 11, 2011

(54) METHOD OF FORMING ARRAY SUBSTRATE FOR LCD

(75) Inventors: Woong-Kwon Kim, Gyeonggi-do (KR); Youn-Gyoung Chang, Gyeonggi-do (KR); Seung-Ryull Park, Incheon (KR)

(73) Assignee: LG Display Co., Ltd., Seoul (KR)

( * ) Notice: Subject to any disclaimer, the term of this patent is extended or adjusted under 35 U.S.C. 154(b) by 145 days.

(21) Appl. No.: 12/591,897

(22) Filed: Dec. 3, 2009

(65) Prior Publication Data

US 2010/0151606 A1    Jun. 17, 2010

Related U.S. Application Data

(62) Division of application No. 11/529,351, filed on Sep. 29, 2006, now Pat. No. 7,646,445, which is a division of application No. 10/728,854, filed on Dec. 8, 2003, now Pat. No. 7,133,105.

(30) Foreign Application Priority Data

Dec. 9, 2002  (KR) ................. 2002-78009

(51) Int. Cl.
  *G02F 1/136*    (2006.01)
  *G02F 1/1335*   (2006.01)
  *G02F 1/1343*   (2006.01)

(52) U.S. Cl. ........... 349/44; 349/106; 349/110; 349/141

(58) Field of Classification Search ............... 349/42–44, 349/106, 110, 141, 143
See application file for complete search history.

(56) References Cited

U.S. PATENT DOCUMENTS

| 5,818,550 A | 10/1998 | Kadota et al. |
| 5,976,734 A | 11/1999 | Yamaguchi |
| 6,900,856 B2 | 5/2005 | Kim et al. |

(Continued)

FOREIGN PATENT DOCUMENTS

KR    1020010010743 A    2/2001

(Continued)

*Primary Examiner* — Huyen Ngo

(74) *Attorney, Agent, or Firm* — McKenna Long & Aldridge LLP

(57) ABSTRACT

An array substrate device having a color filter-on thin film transistor (COT) structure for a liquid crystal display device includes a gate line formed on a substrate along a transverse direction, the gate line including a gate pad at one end thereof, a first insulating layer formed on the substrate to cover the gate line, the first insulating layer exposing a first portion of the gate pad, a data line formed over the first insulating layer along a longitudinal direction on the substrate, the data line defining a pixel region with the gate line and including a data pad at one end thereof, a thin film transistor formed at a crossing region of the gate and data lines, the thin film transistor including a gate electrode, a semiconductor layer, a source electrode, and a drain electrode, a black matrix overlapping the thin film transistor, the gate line, and the data line except a second portion of the drain electrode, a second insulating layer formed over an entire surface of the substrate to cover the black matrix, the second insulating layer exposing the first portion of the gate pad, a third portion of the data pad, and the pixel region, a first pixel electrode within the pixel region and contacting the second exposed portion of the drain electrode, a color filter on the first pixel electrode within the pixel region, and a second pixel electrode on the color filter and contacting the first pixel electrode.

32 Claims, 34 Drawing Sheets

U.S. PATENT DOCUMENTS

| | | |
|---|---|---|
| 6,958,799 B2 | 10/2005 | Tomioka et al. |
| 2002/0008798 A1 | 1/2002 | Song et al. |
| 2002/0012083 A1 | 1/2002 | Tanaka |
| 2002/0024627 A1* | 2/2002 | Sakamoto et al. ............ 349/141 |
| 2002/0033912 A1* | 3/2002 | Tanaka et al. ................. 349/106 |
| 2002/0074549 A1 | 6/2002 | Park et al. |
| 2003/0043326 A1* | 3/2003 | Sawasaki et al. ............. 349/123 |
| 2004/0109102 A1 | 6/2004 | Chang et al. |
| 2005/0082528 A1 | 4/2005 | Kobayashi et al. |

FOREIGN PATENT DOCUMENTS

| | | |
|---|---|---|
| KR | 20020045256 A | 6/2002 |

* cited by examiner

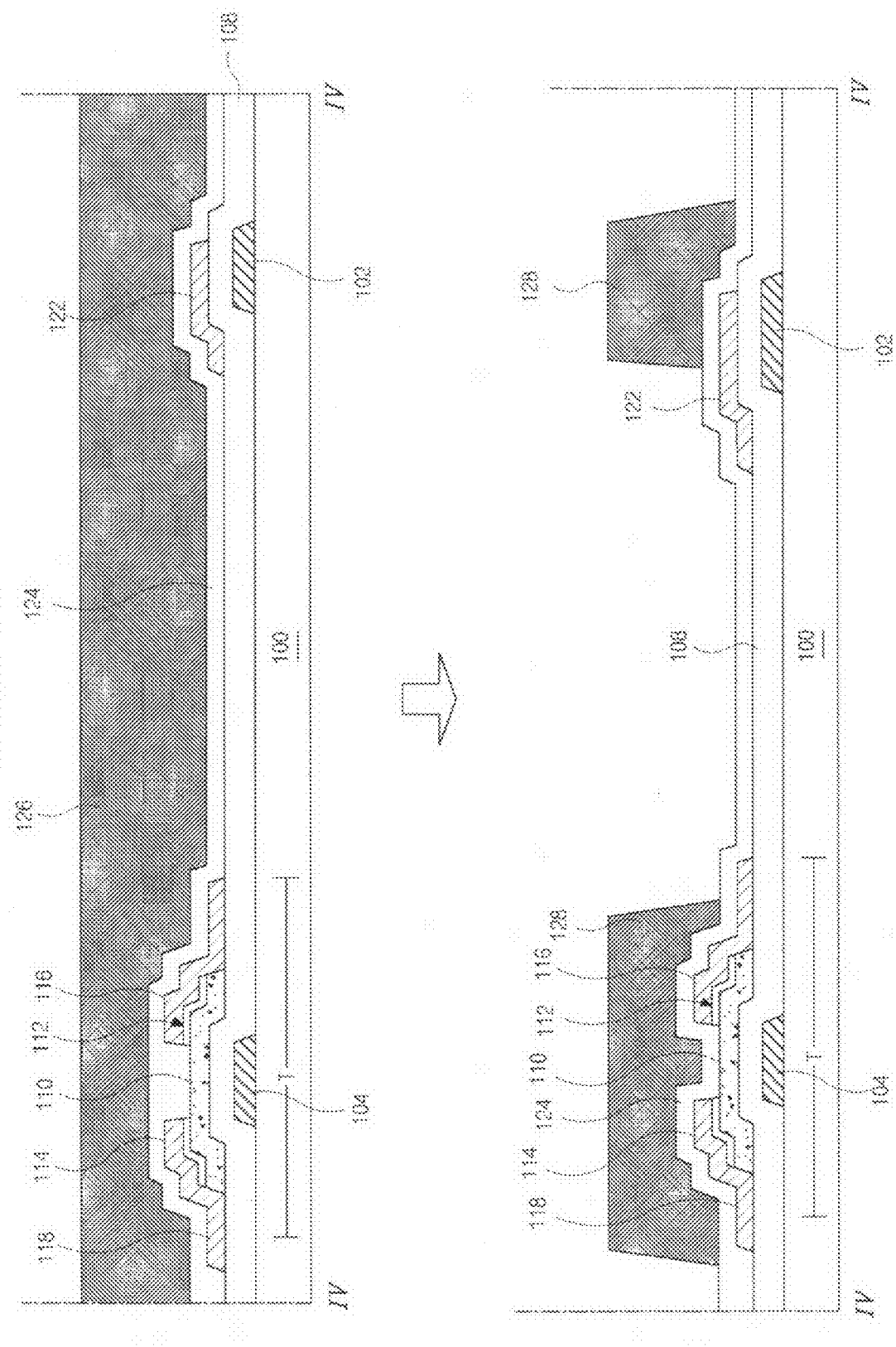

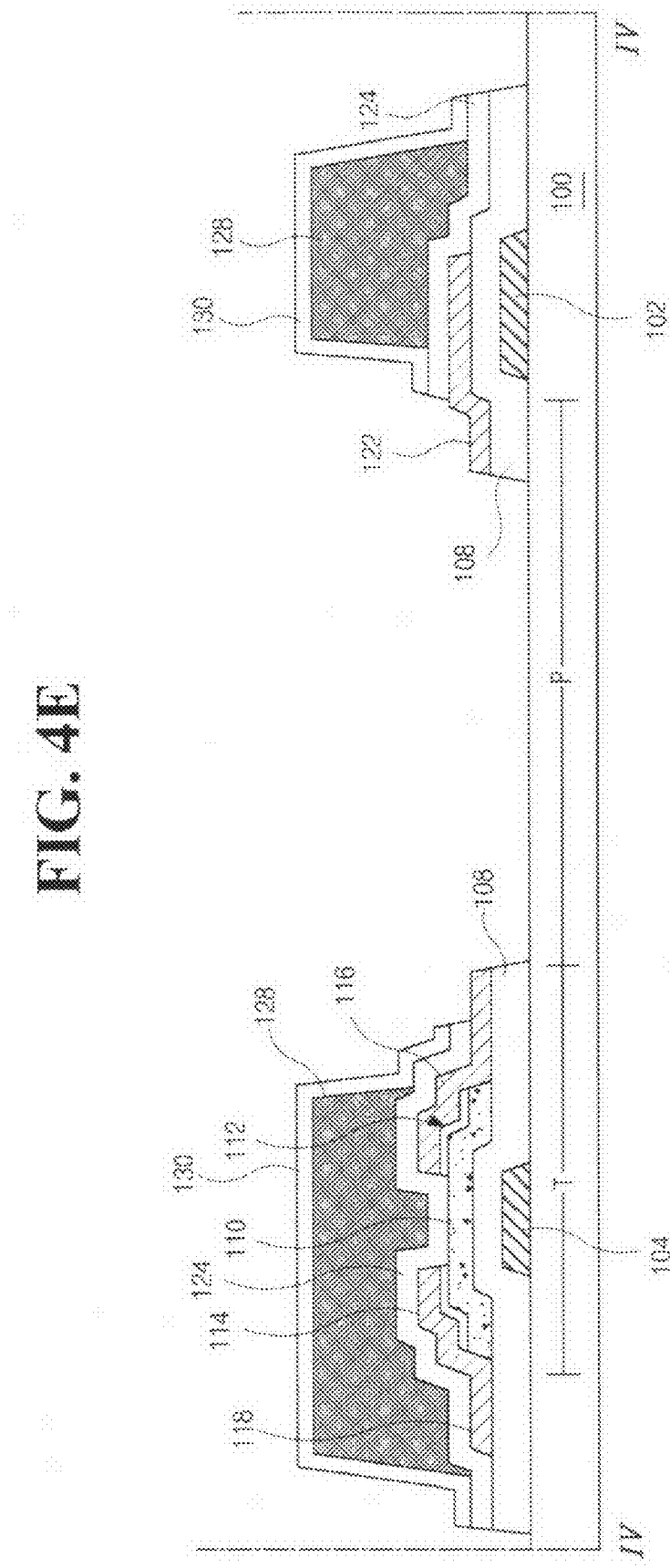

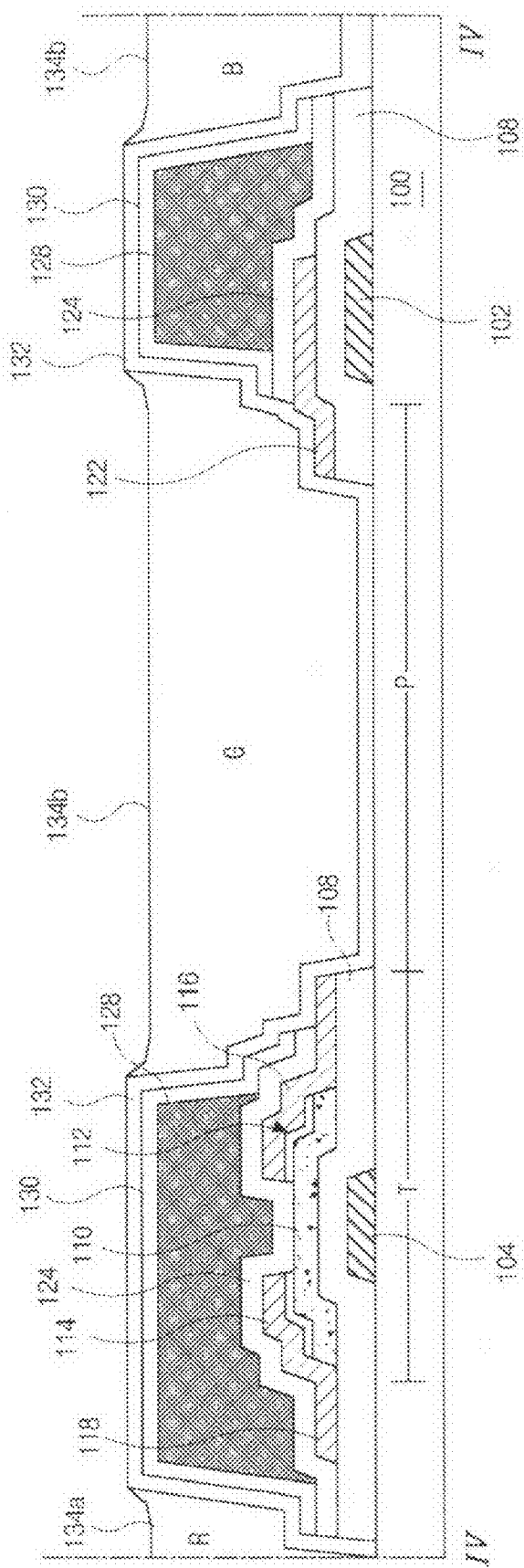

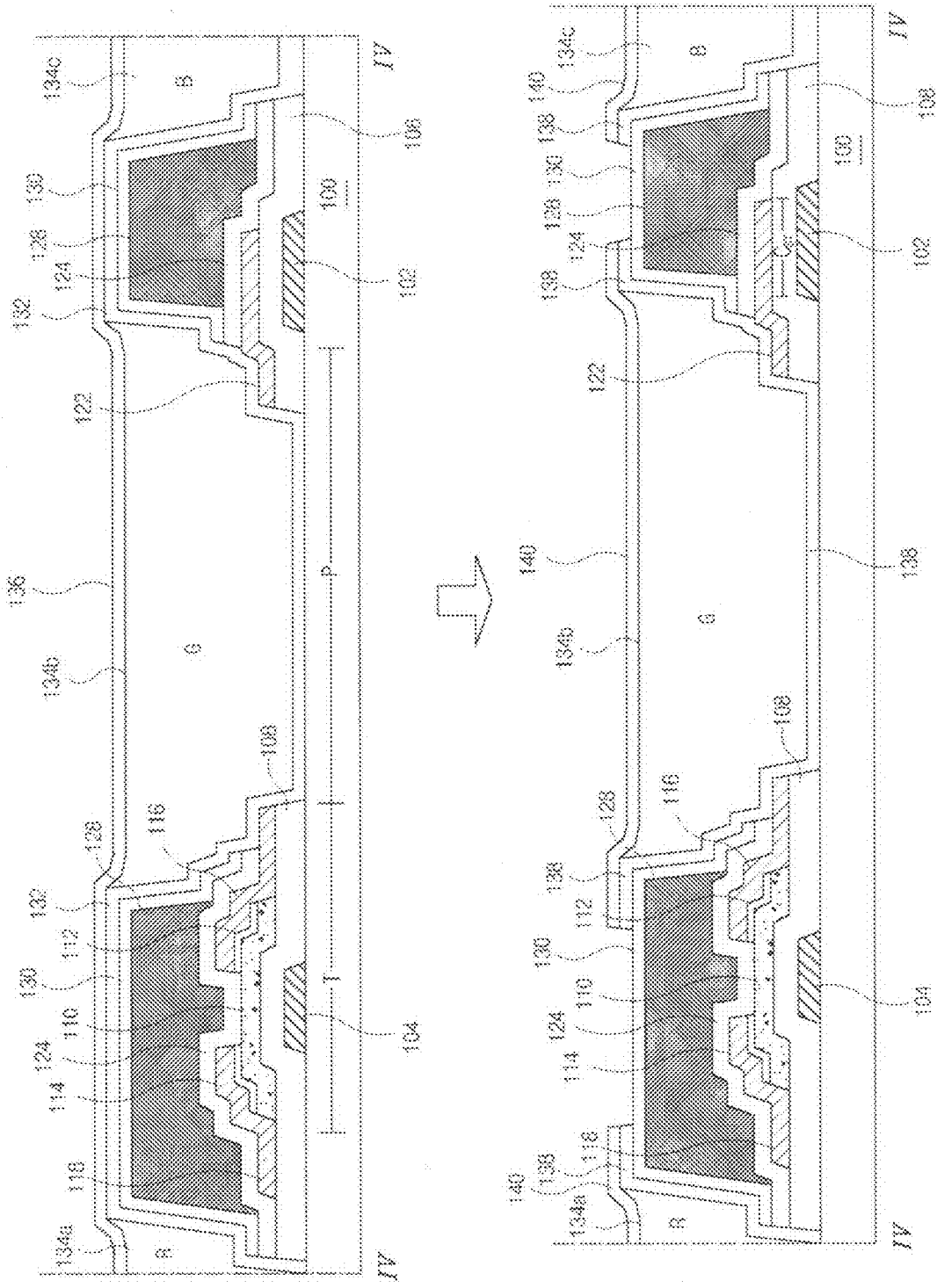

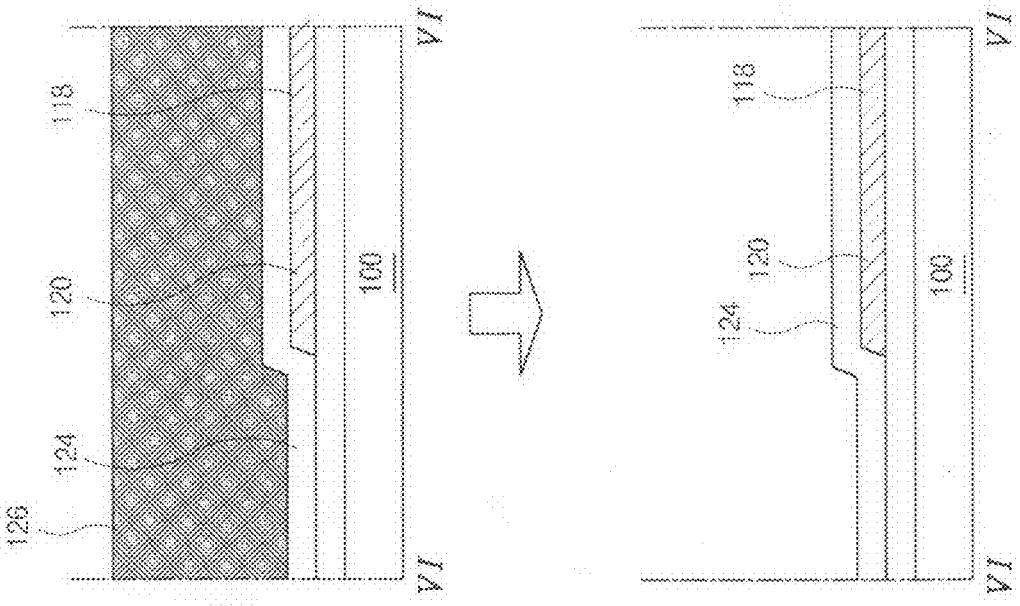
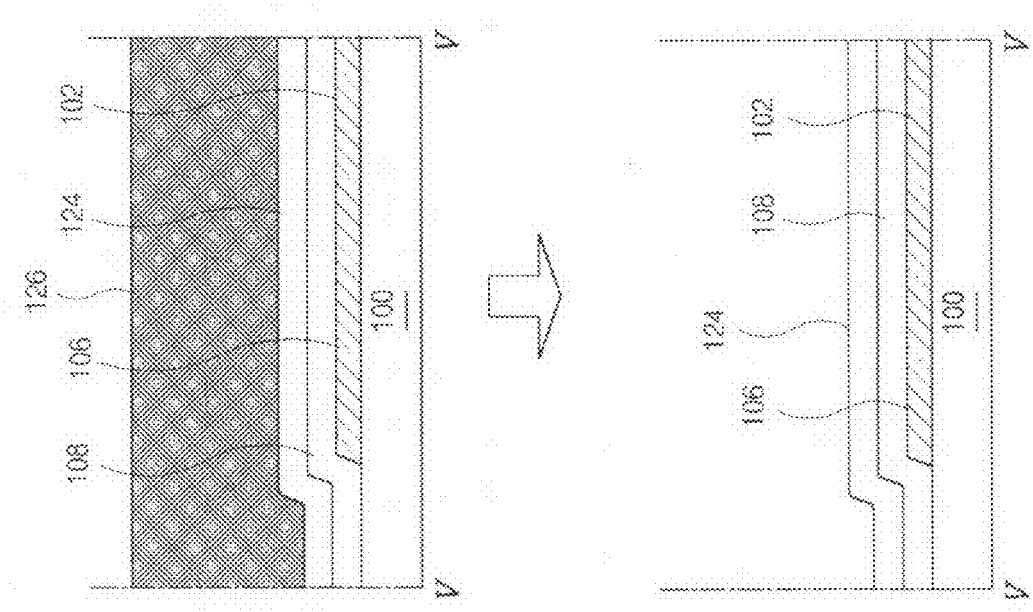

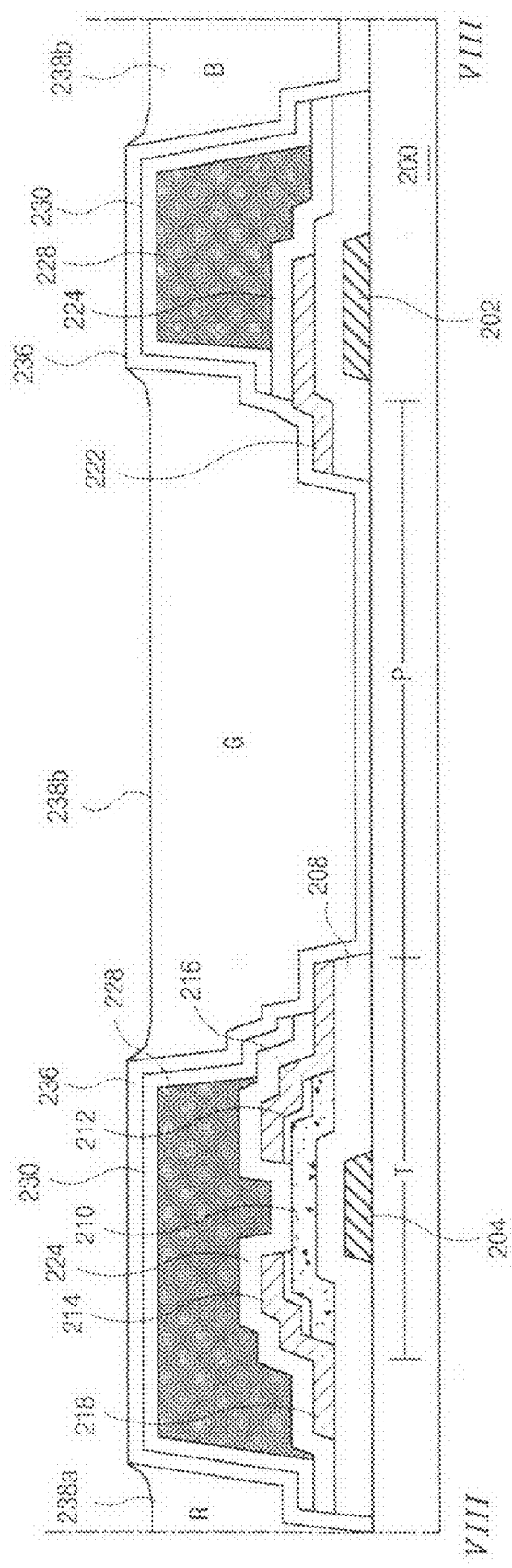

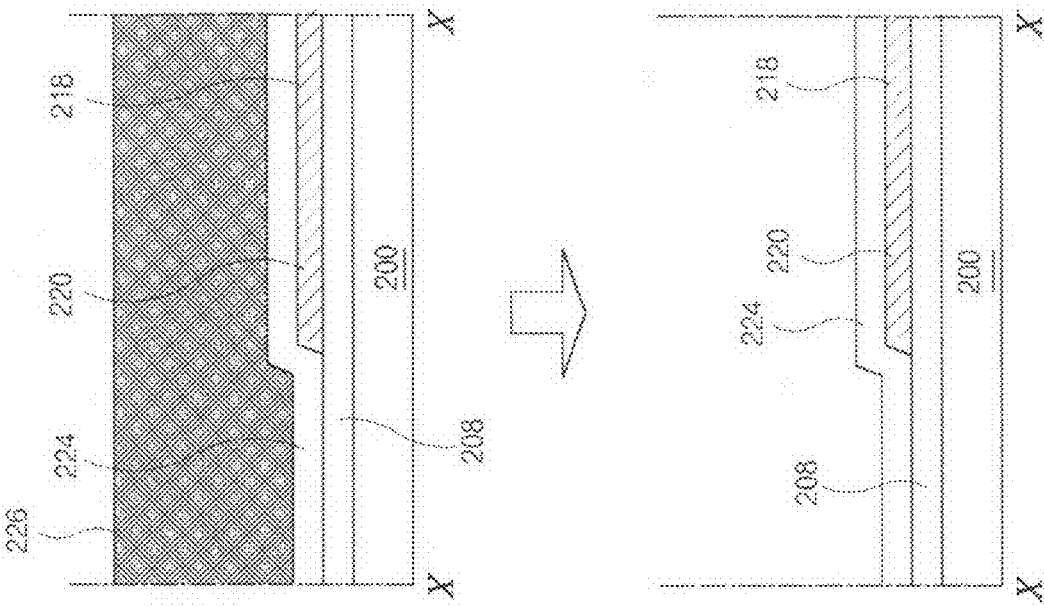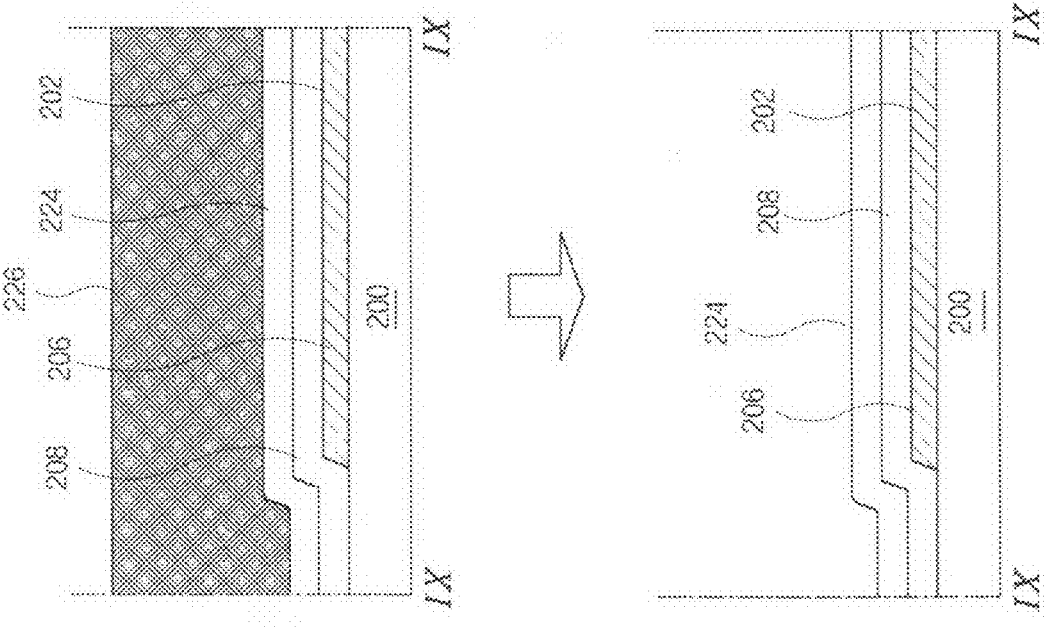

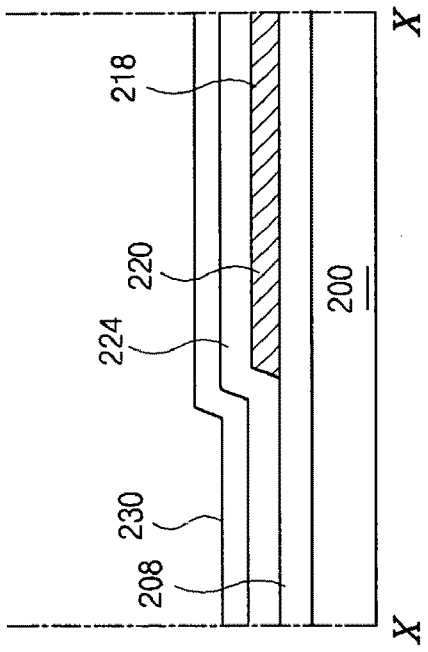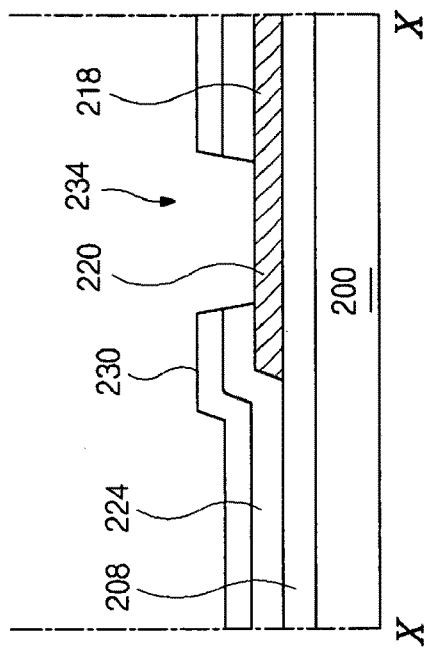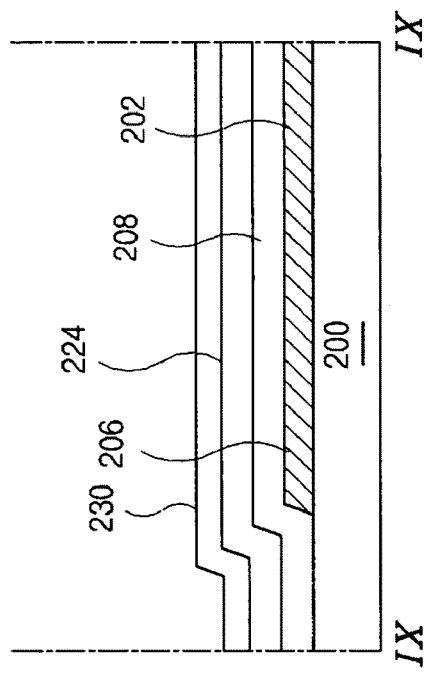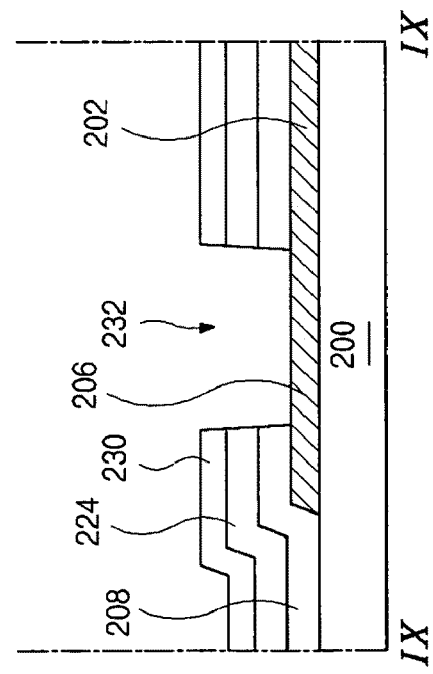

METHOD OF FORMING ARRAY SUBSTRATE FOR LCD

This application is a Divisional of application Ser. No. 11/529,351 filed Sep. 29, 2006, now U.S. Pat. No. 7,646,445 now allowed, which is a divisional of application Ser. No. 10/728,854, filed Dec. 8, 2003, now U.S. Pat. No. 7,133,105 now allowed, which claims priority to Korean Patent Application No. 2002-78009, filed Dec. 9, 2002, each of which are incorporated by reference for all purposes as if fully set forth herein.

The present invention claims the benefit of Korean Patent Application No. P2002-0078009 filed in Korea on Dec. 9, 2002, which is hereby incorporated by reference.

BACKGROUND OF THE INVENTION

1. Field of the Invention

The present invention relates to a display device and a method of fabricating a display device, and more particularly, to an array substrate of a liquid crystal display device and a method of making an array substrate of a liquid crystal display device.

2. Discussion of the Related Art

In general, since flat panel display devices are thin, light weight, and have low power consumption, they are commonly used as displays of portable electronic devices. Among the various types of flat panel display devices, liquid crystal display (LCD) devices are commonly used for laptop computers and desktop computer monitors because of their superior resolution and their ability to produce high quality colored images.

Operation of the LCD devices make use of optical anisotropy and polarization properties of liquid crystal molecules to generate a desired image. The liquid crystal molecules have a specific alignment due to their specific characteristics that can be modified by induced electric fields. For example, the electric fields induced to the liquid crystal molecules can change the alignment of the liquid crystal molecules, and due to the optical anisotropy of the liquid crystal molecules, incident light is refracted according to the alignment of the liquid crystal molecules.

The LCD devices include upper and lower substrates having electrodes that are spaced apart and face into each other, and a liquid crystal material is interposed therebetween. Accordingly, when the electric field is induced to the liquid crystal material through the electrodes of each substrate, an alignment direction of the liquid crystal molecules is changed in accordance with the applied voltage to display images. By controlling the induced voltage, the LCD device provides various light transmittances to display image data.

Among the different types of LCD devices, active matrix LCDs (AM-LCDs) having thin film transistors and pixel electrodes arranged in a matrix form provide high resolution images and superior moving images. A typical LCD panel has an upper substrate, a lower substrate, and a liquid crystal material layer interposed therebetween. The upper substrate, which is commonly referred to as a color filter substrate, includes a common electrode and color filters, and the lower substrate, which is commonly referred to as an array substrate, includes switching elements, such as thin film transistors (TFT's) and pixel electrodes.

FIG. 1 is an expanded perspective view of a liquid crystal display device according to the related art. In FIG. 1, an LCD device 11 includes an upper substrate 5, which is commonly referred to as a color filter substrate, and a lower substrate 22, which is commonly referred to as an array substrate, having a liquid crystal material layer 14 interposed therebetween. A black matrix 6 and a color filter layer 8 are formed in a shape of an array matrix on the upper substrate 5 that includes a plurality of red (R), green (G), and blue (B) color filters surrounded by the black matrix 6. In addition, a common electrode 18 is formed on the upper substrate 5 to cover the color filter layer 8 and the black matrix 6.

A plurality of thin film transistors T are formed in a shape of an array matrix corresponding to the color filter layer 8 on the lower substrate 22, wherein a plurality of crossing gate lines 13 and data lines 15 are perpendicularly positioned such that each TFT T is located adjacent to each intersection of the gate lines 13 and the data lines 15. Furthermore, a plurality of pixel electrodes 17 are formed on a pixel region P defined by the gate lines 13 and the data lines 15 of the lower substrate 22. The pixel electrode 17 includes a transparent conductive material having high transmissivity, such as indium-tin-oxide (ITO) or indium-zinc-oxide (IZO).

In FIG. 1, a storage capacitor C is disposed to correspond to each pixel P and is connected in parallel to each pixel electrode 17. The storage capacitor C comprises a portion of the gate line 13, which functions as a first capacitor electrode, a storage metal layer 30, which functions as a second capacitor electrode, and an interposed insulator 16 (in FIG. 2). Since the storage metal layer 30 is connected to the pixel electrode 17 through a contact hole, the storage capacitor C is electrically contacted to the pixel electrode 17.

Accordingly, a scanning signal is supplied to a gate electrode of the thin film transistor T through the gate line 13, and a data signal is supplied to a source electrode of the thin film transistor T through the data line 15. As a result, liquid crystal molecules of the liquid crystal material layer 14 are aligned and arranged by enablement of the thin film transistor T, and incident light passing through the liquid crystal layer 14 is controlled to display an image. For example, the electric fields induced between the pixel and common electrodes 17 and 18 re-arrange the liquid crystal molecules of the liquid crystal material layer 14 so that the incident light can be controlled to display the desired images in accordance with the induced electric fields.

When fabricating the LCD device 11 of FIG. 1, the upper substrate 5 is aligned with and attached to the lower substrate 22. However, the upper substrate 5 may be misaligned with the lower substrate 22 and light leakage may occur due to a marginal error in attaching the upper and lower substrate 5 and 22.

FIG. 2 is a schematic cross-sectional view along II-II of FIG. 1 showing a pixel of a liquid crystal display device according to the related art. In FIG. 2, the LCD device includes the upper substrate 5, the lower substrate 22, and the liquid crystal layer 14, wherein the upper and lower substrates 5 and 22 are spaced apart from each other, and the liquid crystal layer 14 is interposed therebetween. The thin film transistor T is formed on the front surface of the lower substrate 22 and includes a gate electrode 32, an active layer 34, a source electrode 36, and a drain electrode 38. In addition, a gate insulation layer 16 is interposed between the gate electrode 32 and the active layer 34 to protect the gate electrode 32 and the gate line 13. As shown in FIG. 1, the gate electrode 32 extends from the gate line 13 and the source electrode 36 extends from the data line 15. The gate, source, and drain electrodes 32, 36, and 38 are formed of a metallic material while the active layer 34 is formed of silicon. Furthermore, a passivation layer 40 is formed on the thin film transistor T for protection, wherein the pixel electrode 17 is formed of a transparent conductive material and is disposed on the passivation layer 40 while contacting the drain electrode 38 and the storage metal layer 30.

As previously described, the gate line 13 functions as a first electrode of the storage capacitor C and the storage metal layer 30 functions as a second electrode of the storage capacitor C. Thus, the gate electrode 13 and the storage metal layer 30 constitute the storage capacitor C with the interposed gate insulation layer 16.

In FIG. 2, the upper substrate 5 is spaced apart from the lower substrate 22 over the thin film transistor T. On a rear surface of the upper substrate 5, the black matrix 6 is disposed in positions corresponding to the thin film transistor T, the gate line 13, and the data line 15. For example, the black matrix 6 is formed along an entire surface of the upper substrate 5 and has openings corresponding to the pixel electrode 17 of the lower substrate 22, as shown in FIG. 1. The black matrix 6 prevents light leakage except for portions of the pixel electrode 17 and protects the thin film transistor T from the light, thus preventing generation of photo current in the thin film transistor T. The color filter layer 8 is formed on the rear surface of the upper substrate 5 to cover the black matrix 6 and includes red 8a, green 8b, and blue 8c colors filter corresponding to one pixel region P where the pixel electrode 17 is located. In addition, a common electrode 18 formed of a transparent conductive material is disposed on the color filter layer 8 over the upper substrate 5.

In FIG. 2, the pixel electrode 17 has a one-to-one correspondence with one of the color filters 8a, 8b, and 8c. Furthermore, in order to prevent a cross-talk between the pixel electrode 17 and the gate and data lines 13 and 15, the pixel electrode 17 is spaced apart from the data line 15 by a distance A and from the gate line 13 by a distance B. Accordingly, open spaces within the distances A and B between the pixel electrode 17 and the data and gate line 15 and 13 cause light leakage in the LCD device. For example, the light leakage mainly occurs within the open spaces A and B so that the black matrix 6 formed on the upper substrate 5 should cover those open spaces A and B. However, when arranging the upper substrate 5 with the lower substrate 22 or vice versa, a misalignment may occur between the upper substrate 5 and the lower substrate 22. Thus, the black matrix 6 is extended to fully cover those open spaces A and B to provide an aligning margin to prevent light leakage. However, by extending the black matrix, an aperture ratio of the liquid crystal panel is reduced as much as the aligning margin of the black matrix 6. Moreover, if there are errors in the aligning margin of the black matrix 6, the light leakage still occurs in the open spaces A and B, and deteriorates the image quality of the LCD device.

SUMMARY OF THE INVENTION

Accordingly, the present invention is directed to an array substrate of a liquid crystal display device and a method of fabricating an array substrate that substantially obviates one or more of problems due to limitations and disadvantages of the related art.

An object of the present invention is to provide an array substrate for a liquid crystal display device that provides a high aperture ratio.

Another object of the present invention is to provide a method of fabricating an array substrate for a liquid crystal display device that provides a high aperture ratio.

Another object of the present invention is to provide a method of forming an array substrate for a liquid crystal display device having simplified and stabilized fabricating processes to increase manufacturing yield.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an array substrate device having a color filter-on-thin film transistor (COT) structure for a liquid crystal display device includes a gate line formed on a substrate along a transverse direction, the gate line including a gate pad at one end thereof, a first insulating layer formed on the substrate to cover the gate line, the first insulating layer exposing a first portion of the gate pad, a data line formed over the first insulating layer along a longitudinal direction on the substrate, the data line defining a pixel region with the gate line and including a data pad at one end thereof, a thin film transistor formed at a crossing region of the gate and data lines, the thin film transistor including a gate electrode, a semiconductor layer, a source electrode, and a drain electrode, a black matrix overlapping the thin film transistor, the gate line, and the data line except a second portion of the drain electrode, a second insulating layer formed over an entire surface of the substrate to cover the black matrix, the second insulating layer exposing the first portion of the gate pad, a third portion of the data pad, and the pixel region, a first pixel electrode within the pixel region and contacting the second exposed portion of the drain electrode, a color filter on the first pixel electrode within the pixel region, and a second pixel electrode on the color filter and contacting the first pixel electrode.

In another aspect, a method of forming an array substrate having a color filter-on-thin film transistor (COT) structure for a liquid crystal display device includes forming a gate line on a substrate along a transverse direction, a gate pad at one end of the gate line, and a gate electrode extending from the gate line, forming a first gate insulating layer on the substrate to cover the gate line, the gate pad, and the gate electrode, forming an active layer of intrinsic amorphous silicon and an ohmic contact layer of extrinsic amorphous silicon layer in series on the first gate insulating layer over the gate electrode, forming a data line, a data pad, a source electrode, and a drain electrode, the data line disposed perpendicularly crossing the gate line and defining a pixel region, the data pad disposed at one end of the data line, the source electrode extending from the data line on a first portion of the ohmic contact layer, and the drain electrode spaced apart from the source electrode on a second portion of the ohmic contact layer to form the thin film transistor, forming a second insulating layer over an entire surface of the substrate to cover the thin film transistor, forming a black matrix on the second insulating layer to cover the thin film transistor, the gate line, and the data line except a first portion of the drain electrode, forming a third insulating layer over an entire surface of the substrate to cover the black matrix, patterning the first, second, and third insulating layers to expose the first portion of drain electrode, forming a first transparent electrode layer over an entire surface of the substrate to cover the patterned third insulating layer and contacting the exposed portion of the drain electrode, forming a color filter on the first transparent electrode layer within the pixel region, forming a second transparent electrode layer over an entire surface of the substrate to cover the color filter and the first transparent electrode layer, patterning the first and second transparent electrode layers to form first and second pixel electrodes, and patterning portions of the first, second, and third insulating layers over the gate and data pads to form gate and data pad contact holes, respectively, after forming the first and second pixel electrodes.

In another aspect, an array substrate device having a color filter-on-thin film transistor (COT) structure for a liquid crystal display device includes a gate line formed on a substrate along a transverse direction, the gate line including a gate pad at one end thereof, a first insulating layer formed on the substrate to cover the gate line, the first insulating layer exposing a first portion of the gate pad, a data line formed over the first insulating layer along a longitudinal direction on the substrate, the data line defining a pixel region with the gate line and including a data pad at one end thereof, a thin film transistor formed at a crossing region of the gate and data lines, the thin film transistor including a gate electrode, a semiconductor layer, a source electrode, and a drain electrode, a black matrix overlapping the thin film transistor, the gate line, and the data line except a second portion of the drain electrode, a second insulating layer formed over an entire surface of the substrate to cover the black matrix, the second insulating layer exposing the first portion of the gate pad, a third portion of the data pad, and the pixel region, a first pixel electrode at the pixel region and contacting the exposed second portion of the drain electrode, a color filter on the first pixel electrode at the pixel region, a second pixel electrode on the color filter, contacting the first pixel electrode, first and second gate pad terminals contacting the gate pad, first and second data pad terminals contacting the data pad, a first color filter pattern disposed between the first and second gate pad terminals, and a second color filter pattern disposed between the first and second data pad terminals.

In another aspect, a method of forming an array substrate having a color filter-on-thin film transistor (COT) structure for a liquid crystal display device includes forming a gate line on a substrate along a transverse direction, a gate pad at one end of the gate line, and a gate electrode extending from the gate line, forming a first gate insulating layer on the substrate to cover the gate line, the gate pad, and the gate electrode, forming an active layer of intrinsic amorphous silicon and an ohmic contact layer of extrinsic amorphous silicon layer in series on the first gate insulating layer over the gate electrode, forming a data line, a data pad, a source electrode, and a drain electrode, the data line disposed perpendicularly crossing the gate line and defining a pixel region, the data pad disposed at one end of the data line, the source electrode extending from the data line on a first portion of the ohmic contact layer, and the drain electrode spaced apart from the source electrode on a second portion of the ohmic contact layer to form a thin film transistor at a crossing of the gate and data lines, forming a second insulating layer over an entire surface of the substrate to cover the thin film transistor, forming a black matrix on the second insulating layer and over the thin film transistor, the gate line, and the data line except a first portion of the drain electrode, forming a third insulating layer over an entire surface of the substrate to cover the black matrix, patterning the first, second, and third insulating layers to expose the first portion of drain electrode and to form a gate pad contact hole to the gate pad and a data pad contact hole to the data pad, forming a first transparent electrode layer over an entire surface of the substrate to cover the patterned third insulating layer, the first transparent electrode layer contacting the exposed first portion of the drain electrode, the gate pad through the gate pad contact hole, and the data pad through the data pad contact hole, forming a color filter and first and second color filter patterns on the first transparent electrode layer, the color filter disposed within the pixel region, and the first and second color filter patterns disposed over the gate and data pads, respectively, forming a second transparent electrode layer over an entire surface of the substrate to cover the color filter, the first and second color filter patterns, and the first transparent electrode layer, and patterning the first and second transparent electrode layers to form first and second pixel electrodes, first and second gate pad terminals, and first and second data pad terminals.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIGS. 4A-4H are cross-sectional views along IV-IV of FIG. 3 showing exemplary fabrication process steps according to the present invention;

FIGS. 5A-5H are cross sectional views along V-V of FIG. 3 showing exemplary fabrication process steps according to the present invention;

FIGS. 6A-6H are cross sectional views along VI-VI of FIG. 3 showing exemplary fabrication process steps according to the present invention;

FIGS. 8A-8G are cross sectional views along VIII-VIII of FIG. 7 showing exemplary fabrication process steps according to the present invention;

FIGS. 9A-9G are cross sectional views along IX-IX of FIG. 7 showing exemplary fabrication process steps according to the present invention;

FIGS. 10A-10G are cross sectional views along X-X of FIG. 7 showing exemplary fabrication process steps according to the present invention;

DETAILED DESCRIPTION OF THE PREFERRED EMBODIMENTS

Reference will now be made in detail to the illustrated embodiments of the present invention, examples of which are illustrated in the accompanying drawings.

Figure 1:
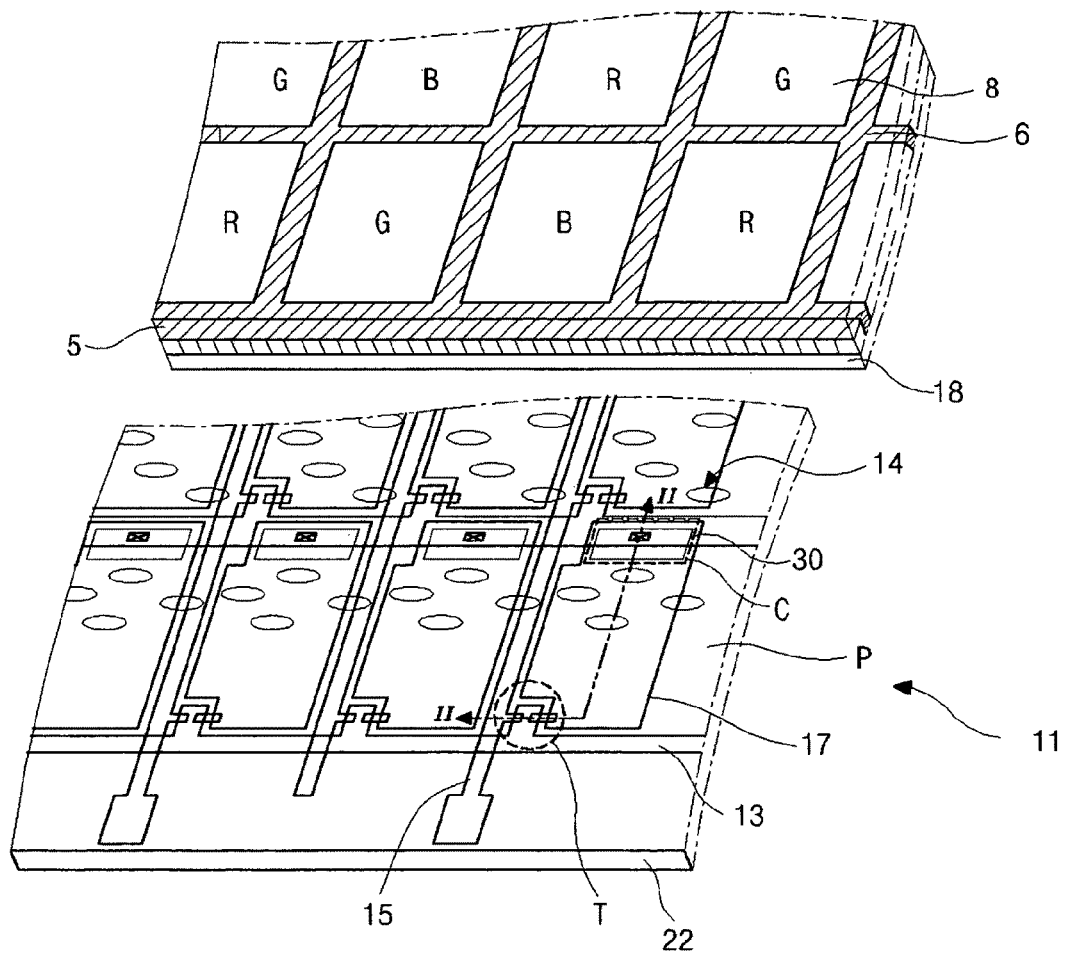
FIG. 1 is an expanded perspective view of a liquid crystal display device according to the related art.
Figure 2:
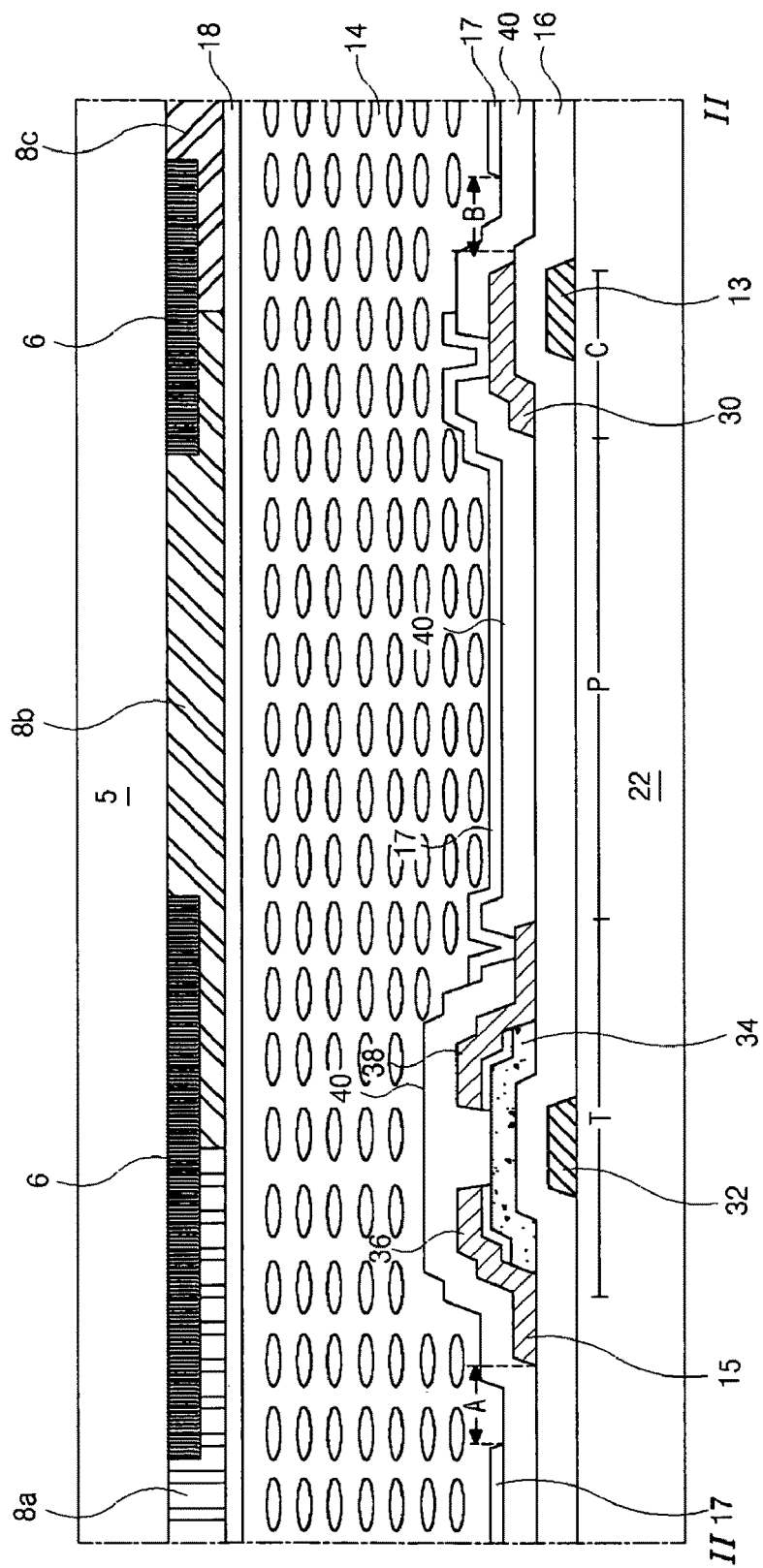
FIG. 2 is a schematic cross-sectional view along II-II of FIG. 1 showing a pixel of a liquid crystal display device according to the related art.
Figure 3:
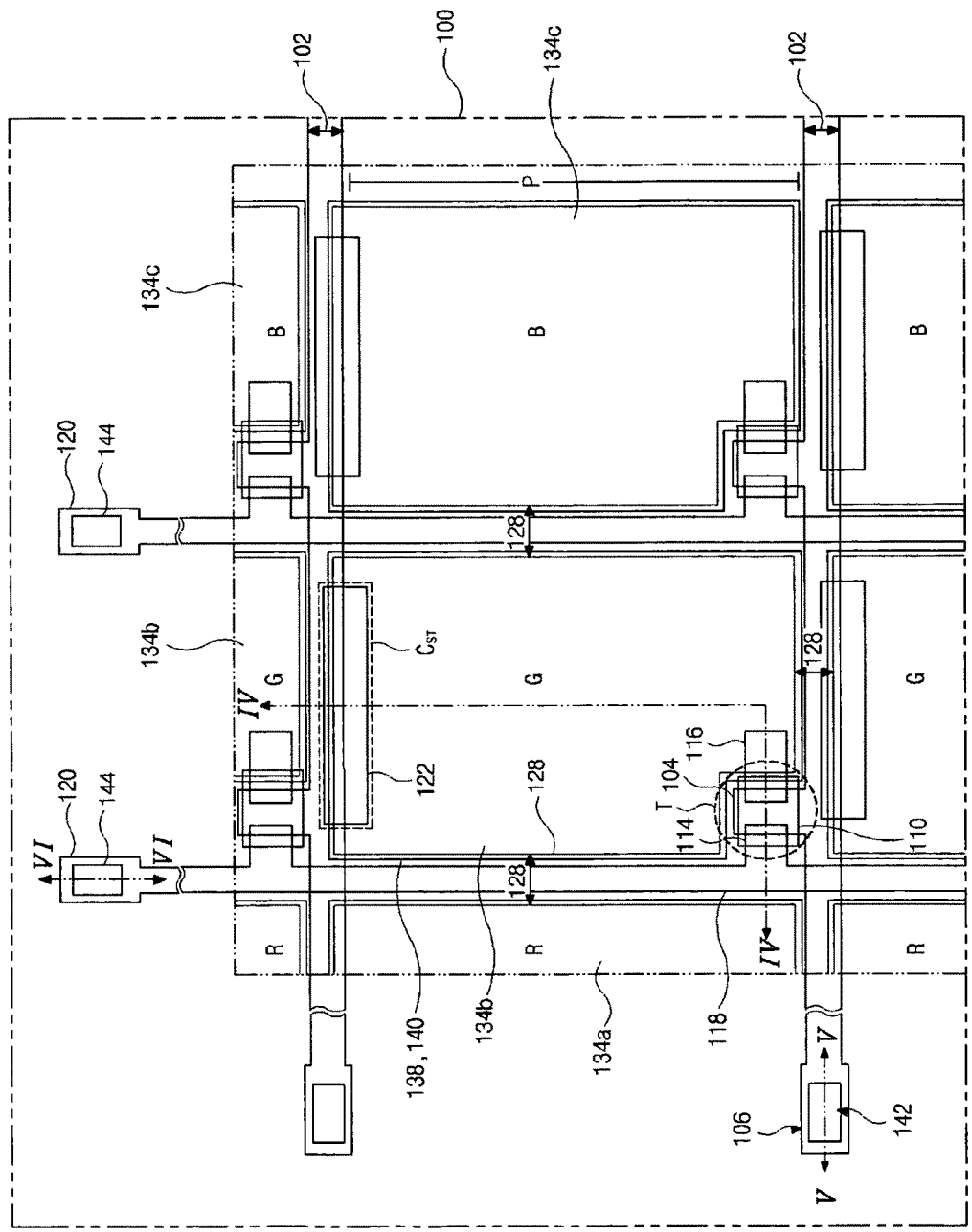
FIG. 3 is a partially enlarged plan view of an exemplary array substrate according to the present invention.

FIG. 3 is a partially enlarged plan view of an exemplary array substrate according to the present invention. In FIG. 3, an array substrate 100 may include a plurality of gate lines 102 disposed along a transverse direction and a plurality of data lines 118 disposed along a longitudinal direction, wherein the plurality of gate lines 102 and the plurality of data lines 118 cross one another to define a pixel region P. Each gate line 102 and each data line 118 may include a gate pad 106 and a data pad 120, respectively, disposed at ends of each gate line 102 and at ends of each data line 118. In addition, a thin film transistor T may be formed at each crossing portion of the gate line 102 and the data line 118, and may include a gate electrode 104, an active layer 110, a source electrode 114, and a drain electrode 116.

Within the pixel regions P defined by the plurality of gate lines and data lines 102 and 118, a plurality of red (R); green (G), and blue (B) color filters 134a, 134b and 134c may be located therein. In addition, a double-layered pixel electrode structure including first and second pixel electrodes 138 and 140 may be disposed corresponding to each pixel region P. The first pixel electrode 138 and the second pixel electrode 140 may have similar shapes. Alternatively, the first pixel electrode 138 and the second pixel electrode 140 may have dissimilar shapes. Although not shown, the first pixel electrode 138 may be disposed beneath the color filter 134 and may contact the drain electrode 116, and the second pixel electrode 140 may be disposed on the color filter 134 and may contact the first pixel electrode 138. Accordingly, the color filter 134 may be located between the first and second pixel electrodes 138 and 140, and the second pixel electrode 140 may electrically contact the drain electrode 116 through the first pixel electrode 138.

In FIG. 3, a storage capacitor $C_{ST}$ may be provided within a portion of the gate line 102 and a storage metal layer 122. Accordingly, the portion of the gate line 102 may function as a first electrode of the storage capacitor $C_{ST}$, and the storage metal layer 122 may function as a second electrode of the storage capacitor $C_{ST}$. In addition, the first and second pixel electrodes 138 and 140 may electrically contact the storage metal layer 122 such that they may be electrically connected to the storage capacitor $C_{ST}$ in parallel.

In FIG. 3, the array substrate 100 may include a color filter-on-thin film transistor (COT) structure. In such a COT structure, a black matrix 128 and the color filters 134 may be formed on the array substrate 100. The black matrix 128 may be disposed to correspond to the thin film transistors T, the gate lines 102, and the data lines 118 to prevent light leakage in the LCD device. The black matrix 128 may be formed of an opaque organic material, thereby blocking the light incident to the thin film transistors T and protecting the thin film transistors T from external impact.

In FIG. 3, a gate pad contact hole 142 and a data pad contact hole 144 may be provided to expose the gate pad 106 and the data pad 120, respectively. A process for forming the gate and data pad contact holes 142 and 144 may be performed during a final process of forming the array substrate 100 after formation of the double-layer structure of the pixel electrodes 138 and 140 and the color filters 134. Accordingly, developing solution used to pattern the color filters 134a, 134b, and 134c may not compromise the gate and data pads 106 and 120 that may be formed of aluminum-based material(s).

FIGS. 4A-4H are cross-sectional views along IV-IV of FIG. 3 showing exemplary fabrication process steps according to the present invention, FIGS. 5A-5H are cross sectional views along V-V of FIG. 3 showing exemplary fabrication process steps according to the present invention, and FIGS. 6A-6H are cross sectional views along VI-VI of FIG. 3 showing exemplary fabrication process steps according to the present invention.

Figure 4A:
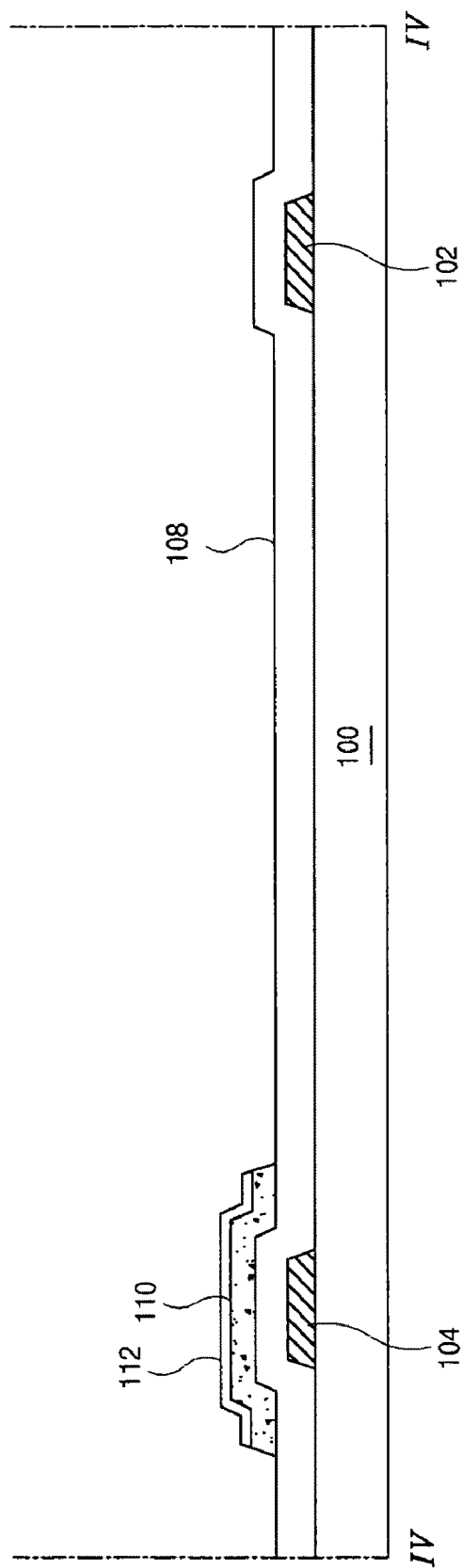
Figure 5A:
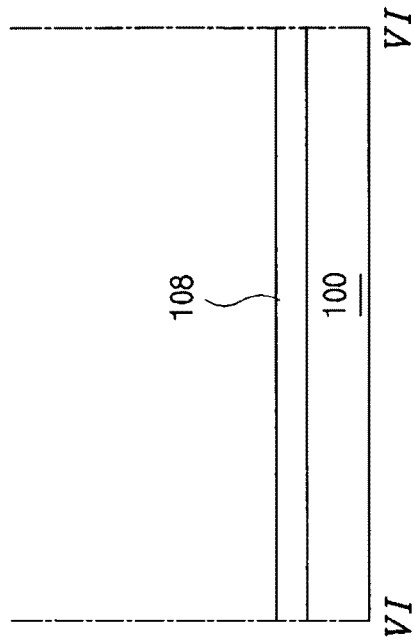
Figure 6A:
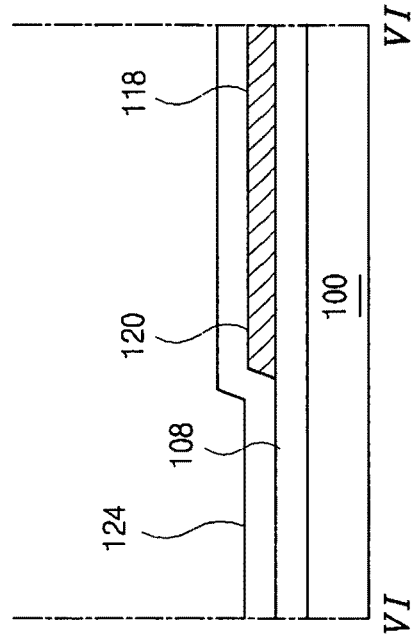

In FIGS. 4A, 5A, and 6A, a first metal layer may be deposited onto a surface of a substrate 100, and then patterned using a mask process to form a gate line 102, a gate electrode 104, and a gate pad 106. As mentioned before, the gate pad 106 may be disposed at the end of the gate line 102, and the gate electrode 104 may extend from the gate line 102. The first metal layer may include aluminum-based material(s) having low electrical resistance in order to prevent signal delay. Since the aluminum-based material(s) have poor corrosion resistance to developing solutions for patterning the color filters, the aluminum-based material(s) may be damaged by the developing solution during the patterning the color filters. For example, if a transparent gate pad terminal is additionally formed on the gate pad 106, the developing solution may cause Galvanic corrosion between the transparent gate pad terminal and the gate pad 106, thereby eroding the gate pad 106.

After formation of the gate line 102, the gate electrode 104, and the gate pad 106 on the substrate 100, a gate insulation layer 108 (or a first insulating layer) may be formed on the substrate 100 to cover the gate line 102, the gate electrode 104, and the gate pad 106. The gate insulation layer 108 may include inorganic material(s), such as silicon nitride ($SiN_x$) and silicon oxide ($SiO_2$). Then, an intrinsic amorphous silicon layer (e.g., a-Si:H) and a doped amorphous silicon layer (e.g., $n^+$a-Si:H) may be sequentially deposited along an entire surface of the gate insulation layer 108, and may be simultaneously patterned using a mask process to form an active layer 110 and an ohmic contact layer 112. The ohmic contact layer 112 may be located on the active layer 110 over the gate electrode 104.

Figure 4B:
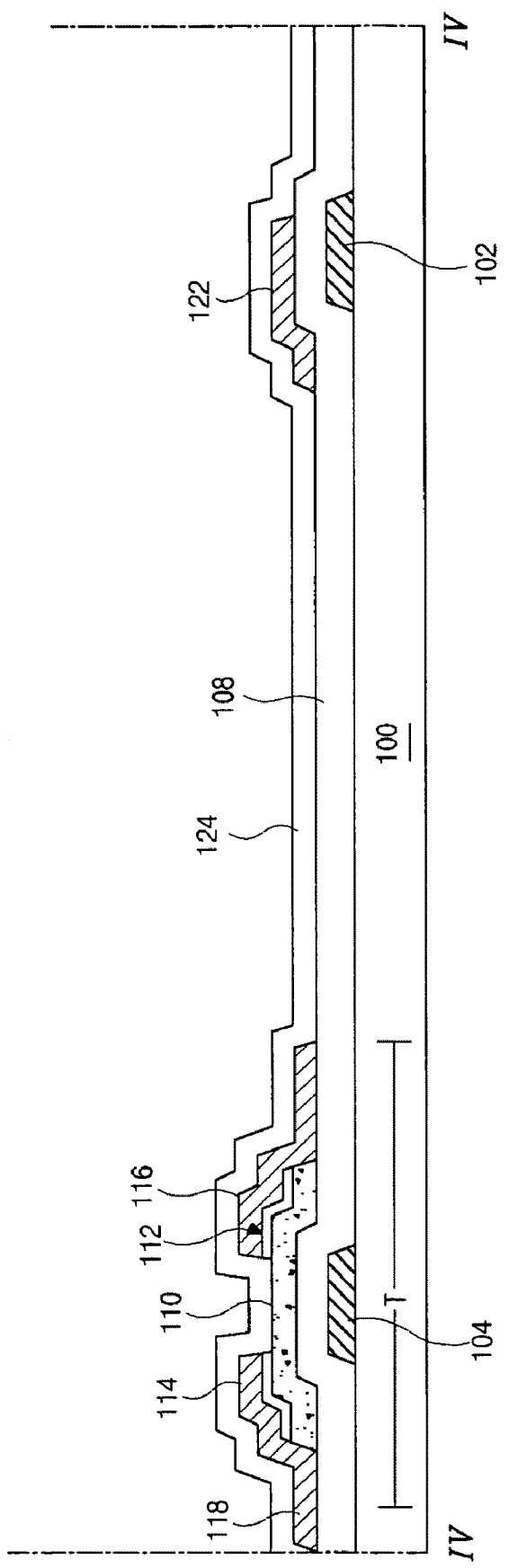
Figure 5B:
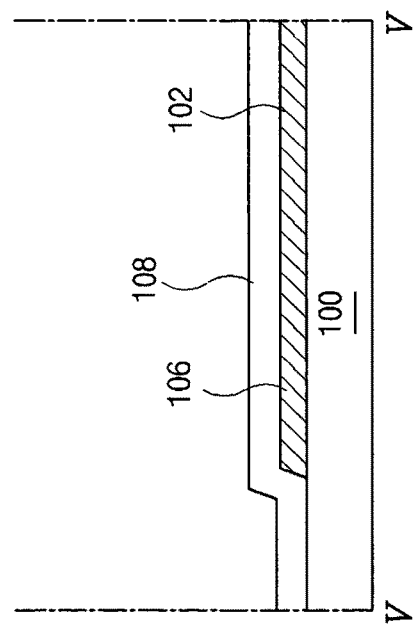
Figure 6B:
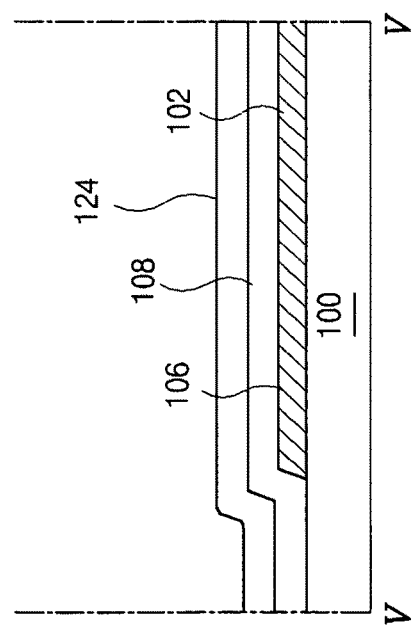

In FIGS. 4B, 5B, and 6B, after forming the active layer 110 and the ohmic contact layer 112, a second metal layer may be deposited over the substrate 100, and then patterned using a mask process to form a source electrode 114, a drain electrode 116, a data line 118, a storage metal layer 122, and a data pad 120. The second metal layer may include at least one of chromium (Cr), molybdenum (Mo), tungsten (W), titanium (Ti), copper (Cu), and an alloy of any combination thereof. The source electrode 114 may extend from the data line 118 and may contact one portion of the ohmic contact layer 112, and the drain electrode 116 may be spaced apart from the source electrode 114 and may contact another portion of the ohmic contact layer 112. In addition, the storage metal layer 122 may overlap a portion of the gate line 102, and the data pad 120 may be connected to the data line 118 at the end of the data line 118.

Next, a portion of the ohmic contact layer 112 located between the source and drain electrodes 114 and 116 may be etched using the source and drain electrodes 114 and 116 as masks. Accordingly, a thin film transistor T and a storage capacitor $C_{ST}$ (in FIG. 3) may be formed, wherein the thin film transistor T may include the gate electrode 104, the active layer 110, the ohmic contact layer 112, the source electrode 114, and the drain electrode 116, and the storage capacitor $C_{ST}$ (in FIG. 3) may include of the gate line 102, the storage metal layer 122, and the interposed first insulator 108.

Then, a second insulating layer 124 may be deposited along an entire surface of the substrate 100 to cover the patterned second metal layer. The second insulating layer 124 may be formed of silicon nitride ($SiN_x$) or silicon oxide ($SiO_2$) and may enhance adhesion of an organic layer to be subsequently formed. The second insulating layer 124 prevents insufficient contact between the active layer 110 and the subsequently-formed organic layer. However, if contact between the active layer 110 and the subsequently-formed organic layer is sufficient, the second insulating layer 124 may not be necessary.

In FIGS. 4C, 5C, and 6C, an opaque organic material 126 having a low dielectric constant may be deposited on the second insulating layer 124, wherein the opaque organic material 126 may have a black color to function as a black matrix. Then, the opaque organic material 126 formed on the second insulating layer 124 may be patterned using a mask process. Accordingly, a black matrix 128 may be formed over the thin film transistor T, the data line 118, and the gate line 102 that are disposed in a display area. Since the black matrix 128 includes organic material(s), it may provide protection to the thin film transistor T. In addition, the black matrix 128 may cover a portion of the storage metal layer 122, thereby protecting the storage capacitor Cst (in FIG. 3).

Figure 4D:
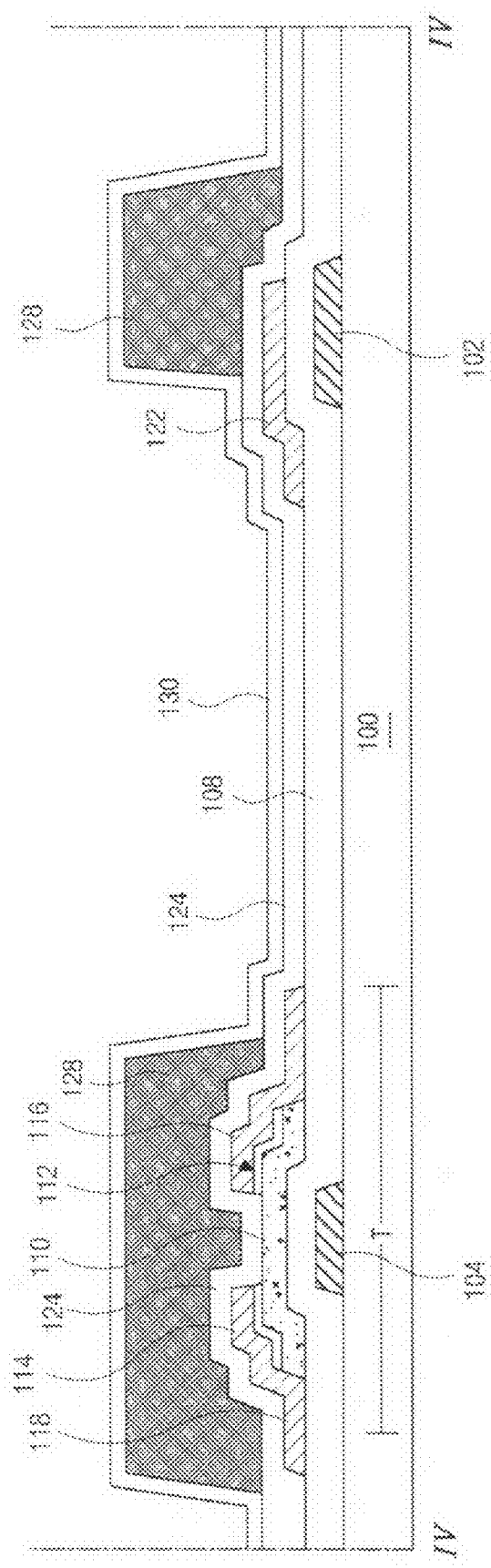
Figure 5D:
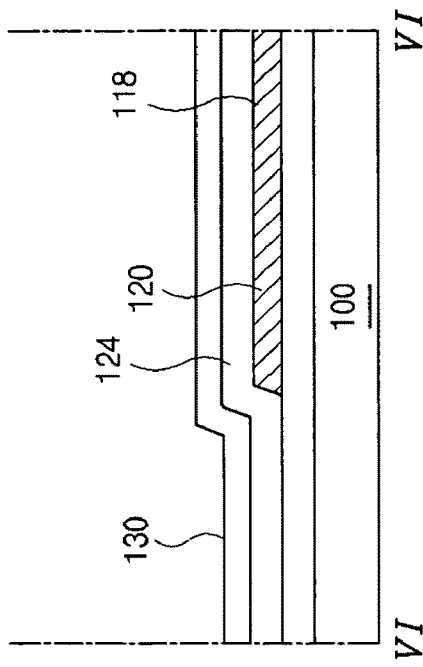
Figure 6D:
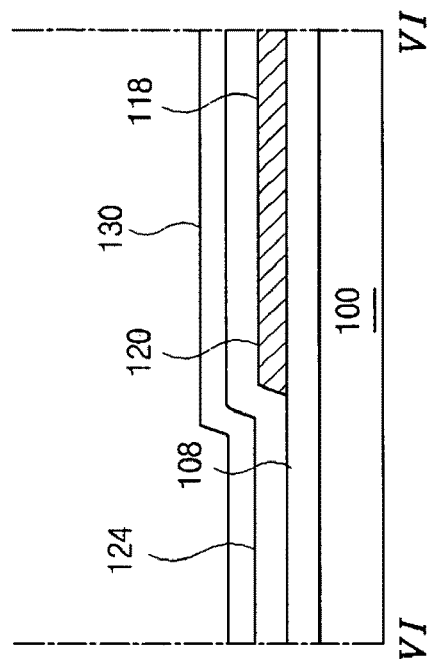

In FIGS. 4D, 5D, and 6D, a third insulating layer 130 may be formed along an entire surface of the substrate 100 to cover the black matrix 128. The third insulating layer 130 may includes inorganic insulating material(s), such as silicon nitride ($SiN_X$) or silicon oxide ($SiO_2$).

Figure 5E:
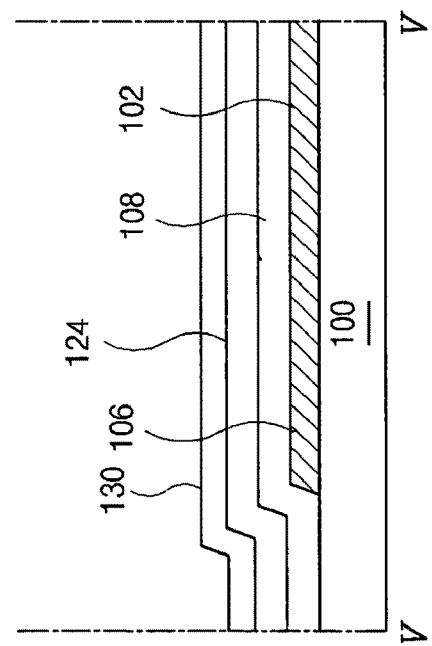
Figure 6E:
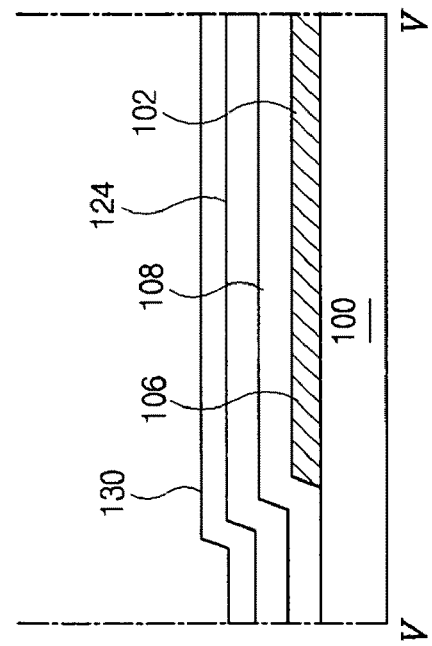

In FIGS. 4E, 5E, and 6E, the first, second, and third insulating layers 108, 124 and 130 may be simultaneously patterned within the pixel region P using a mask process. Accordingly, an end side portion of the drain electrode 106 and an end side portion of the storage metal layer 122 may be exposed. Although FIG. 4E shows that the substrate 100 may be exposed by patterning the first insulating layer 108, the first insulating layer 108 may remain and only the second and third insulating layers 124 and 130 may be patterned to expose the side portions of the drain electrode 106 and storage metal layer 122. Furthermore, remaining portions of the first insulating layer 106 on the substrate 100 may control a height of a subsequently-formed color filter. During patterning of the first, second, and third insulating layers 108, 124 and 130 in the pixel region P, portions of the first, second, and third insulating layers 108, 124, and 130 may not be patterned so that the gate and data pads 106 and 120 may not be exposed, as shown in FIGS. 5E and 6E.

Figure 6F:
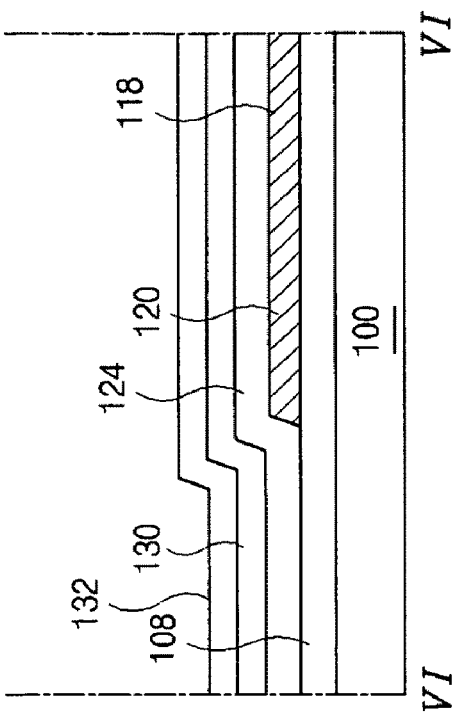
Figure 5F:
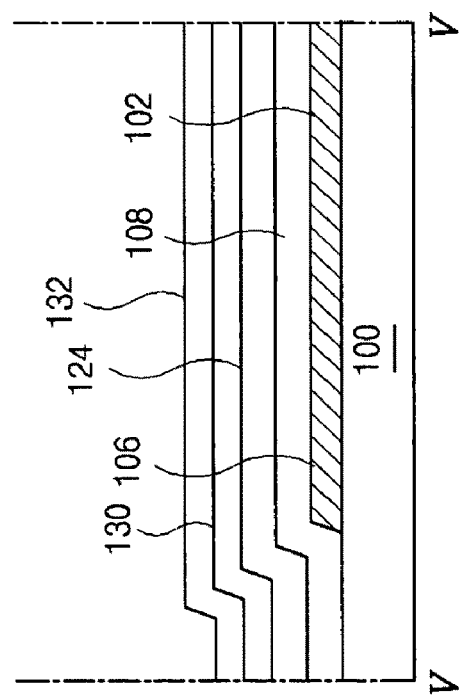

In FIGS. 4F, 5F and 6F, a first transparent electrode layer 132 and color filters 134 may be formed. The first transparent electrode layer 132, which may include at least one of indium tin oxide (ITO) and indium zinc oxide (IZO), may be deposited along an entire surface of the substrate 100 to cover the patterned third insulating layer 130 and to contact the exposed side portions of the drain electrode 106 and storage metal layer 122.

Next, color resin may be formed on the first pixel electrode 138 and then developed to form color filters 134a, 134b, and 134c having red (R), green (G), and blue (B) colors, respectively. The color filters 134a, 134b, and 134c, which may provide for displaying a full spectrum of colors, may be formed within the pixel regions P on the first transparent electrode layer 132. When developing the color resin, the first transparent electrode layer 132 may prevent developing solution (i.e., a developer) used to pattern the color filters 134d, 134b; and 134c from penetrating into underlying metallic layers. In step portions of the gate line 102, the gate electrode 104, and the gate pad 106, the gate insulation layer 108 and other insulating layers may be formed having defects, such as pinholes and cracks. Accordingly, when developing the color filters 134a, 134b, and 134c, the developer for the color filters 134a, 134b, and 134c may penetrate into the first, second, and third insulating layers 108, 124, and 130, thereby deteriorating the gate line 102, the gate electrode 104, and the gate pad 106 that are formed of aluminum-based material(s). However, by forming the first transparent electrode layer 132, deterioration of the gate line 102, the gate electrode 104, and the gate pad 106 may be prevented, thereby stabilizing the fabrication process(es). Furthermore, the chemically weak gate line 102, gate electrode 104, and gate pad 106 may be protected from the developer by the first transparent electrode layer 132.

Figure 6G:
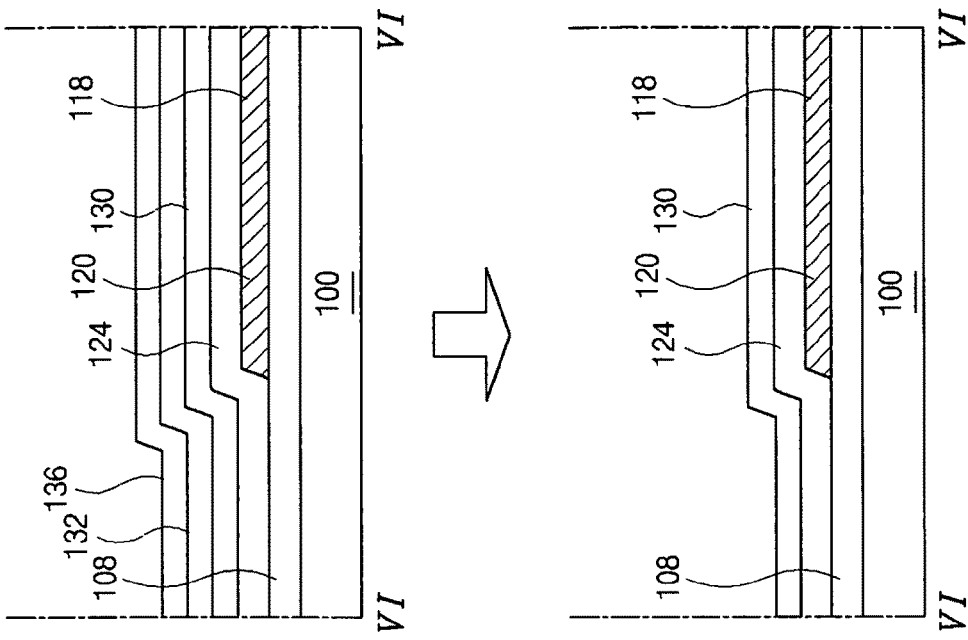
Figure 5G:
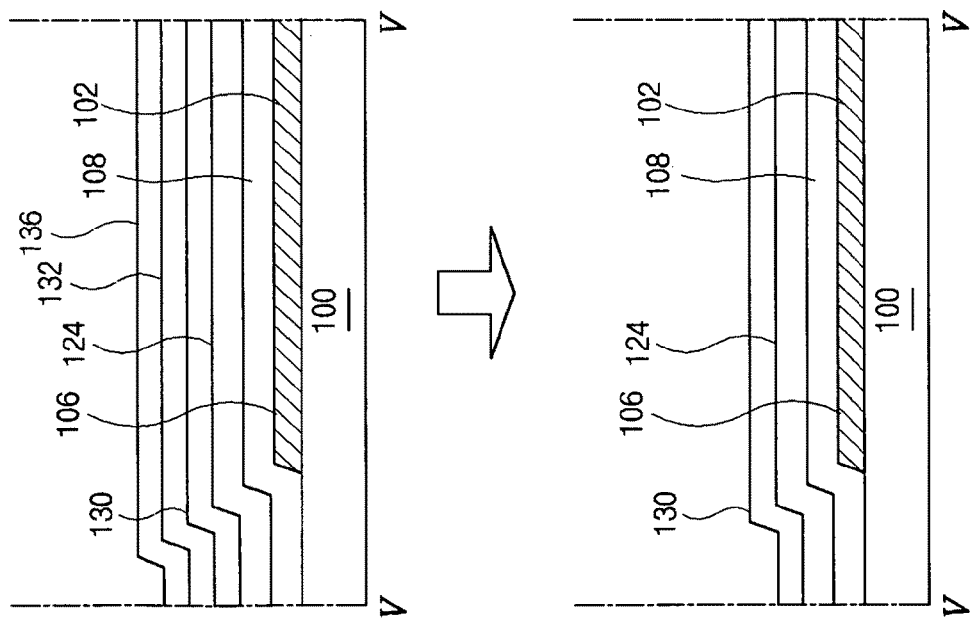

In FIGS. 4G, 5G and 6G, a second transparent electrode layer 136 may be formed along an entire surface of the substrate 100 so as to contact the color filters 134 and the exposed portions of the first transparent electrode layer 132. The second transparent electrode layer 136 may include at least one of indium tin oxide and indium zinc oxide similar to the first transparent electrode layer 132. In FIG. 4G, the second transparent electrode layer 136 may contact the first transparent electrode layer 132 at both sides of each color filter 134.

In addition, the first and second transparent electrode layers 132 and 136 may be simultaneously patterned to form a double-layered pixel electrode (i.e., sandwich pixel electrode) that may include a first pixel electrode 138 and a second pixel electrode 140. The first and second transparent electrode layers 132 and 136 may be simultaneously patterned using a common mask, so that the sandwich pixel electrode may be formed corresponding to each pixel region P. Alternatively, the first transparent electrode layer 132 may be first patterned, the color filters may be formed thereon, and then the second transparent electrode layer 136 may be patterned. Each color filter 134 may be interposed within the sandwich pixel electrode so that they may be located between the first and second pixel electrodes 138 and 140.

In FIG. 4G, the second pixel electrode 140 may contact the first pixel electrode 138 at both sides of the color filter 134. Accordingly, the sandwich pixel electrode may contact the thin film transistor T and may be connected in parallel to the storage capacitor $C_{ST}$.

In FIGS. 5G and 6G, when forming the sandwich pixel electrode of first and second pixel electrodes 138 and 140, the first and second transparent electrode layers 132 and 136 disposed over the gate and data pads 106 and 120 may be removed to expose the underlying third insulating layer 130.

Figure 4H:
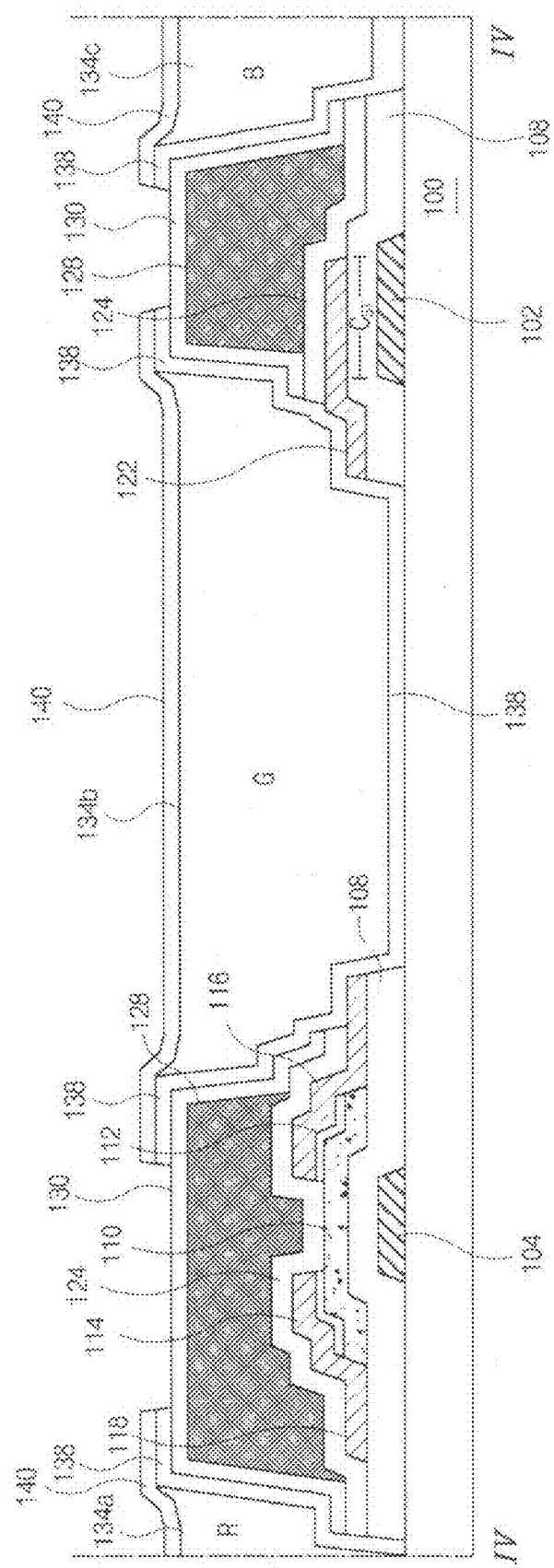
Figure 6H:
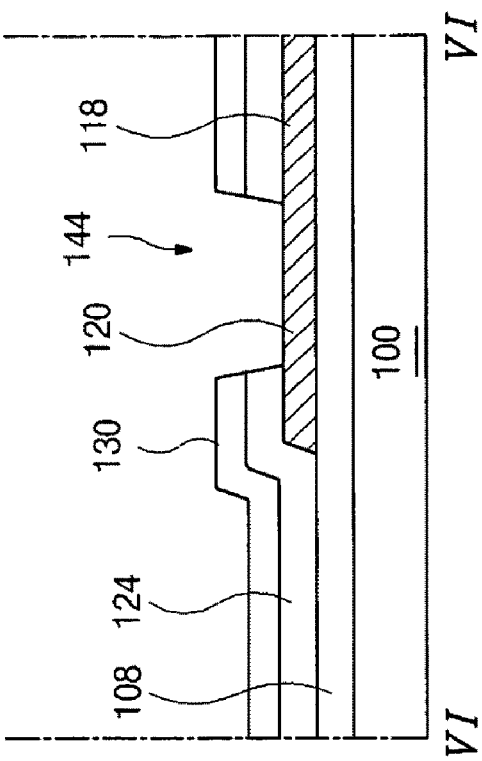
Figure 5H:
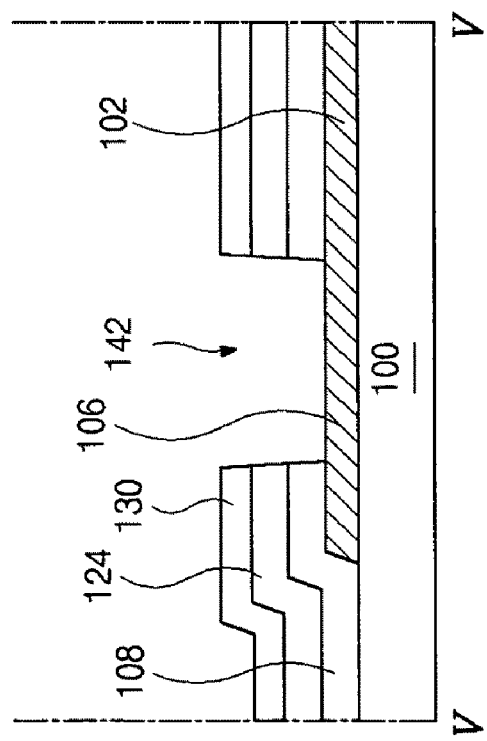

In FIGS. 4H, 5H, and 6H, the gate pad 106 may be exposed by patterning portions of the first, second, and third insulating layers 108, 124, and 130 disposed over the gate pad 106, thereby forming a gate pad contact hole 142. Furthermore, the data pad 120 may also be exposed by patterning portions of the second and third insulating layers 124 and 130 disposed over the data pad 120, thereby forming a data pad contact hole 144. During formation of the gate and data pad contact holes 142 and 144, there may be no change within the pixel regions P (in FIG. 4H).

Accordingly, since the process steps for forming the gate and data pad contact holes 142 and 144 may be performed as a final fabrication step for forming the array substrate, the developer for patterning the color filters may not adversely affect or damage the gate and data pads 106 and 120. Namely, the portions of the first, second, and third insulating layers 108, 124, and 130 accumulated on and over the gate and data pads 106 and 120 may protect the gate and data pads 106 and 120 from the developer until portions of the gate and data pads 106 and 120 are exposed.

Figure 7:
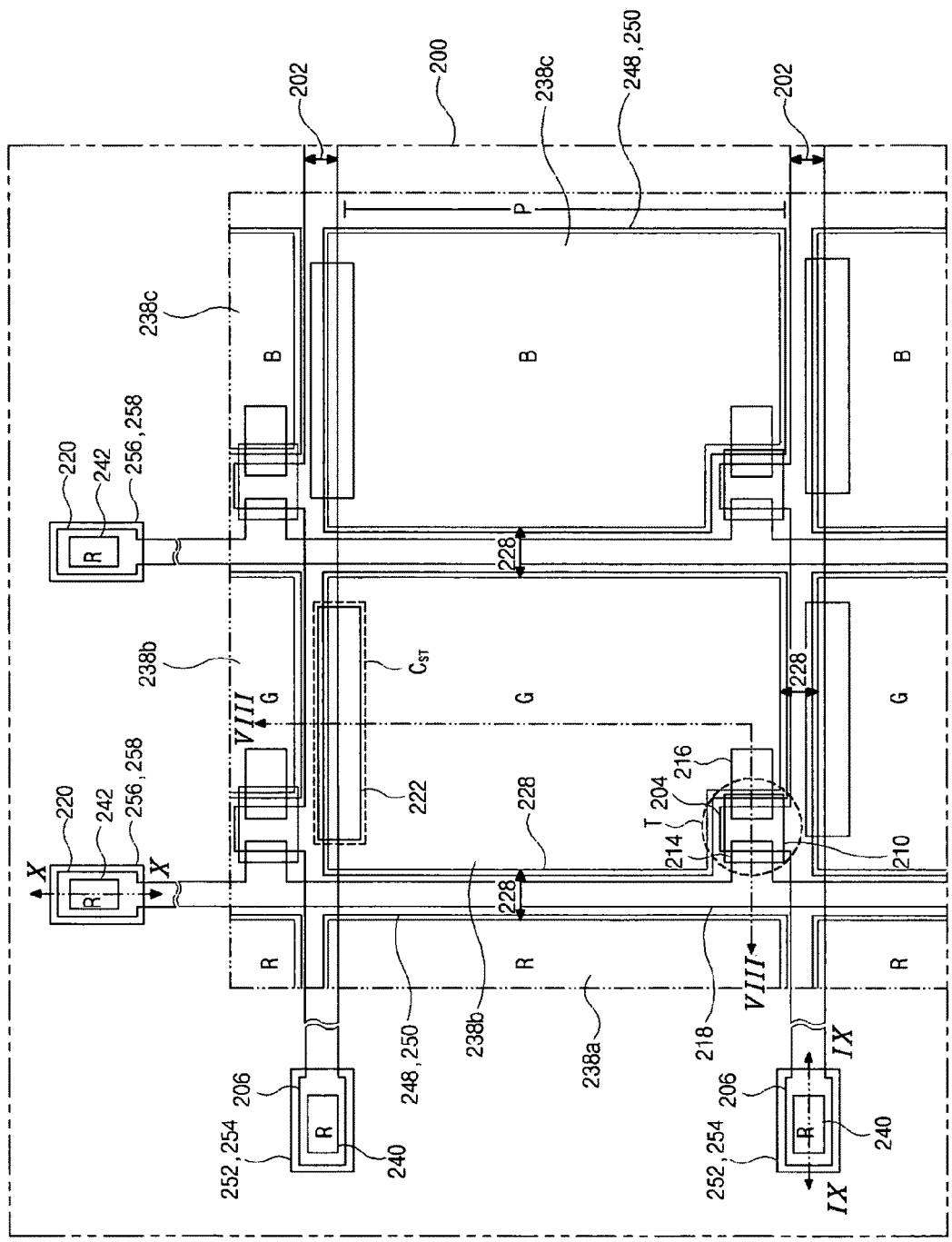
FIG. 7 is a partially enlarged plan view of another exemplary array substrate according to the present invention.

FIG. 7 is a partially enlarged plan view of another exemplary array substrate according to the present invention. In FIG. 7, an array substrate 200 may include a plurality of gate lines 202 disposed along a transverse direction and a plurality of data lines 218 disposed along a longitudinal direction, wherein the plurality of gate lines 202 and the plurality of data lines 218 may cross one another defining a pixel region P. In addition, each gate line 202 and each data line 218 may include a gate pad 206 and a data pad 220, respectively, at ends of each gate line 202 and at ends of each data line 218. Moreover, a thin film transistor T may be formed at each crossing portion of the gate line 202 and the data line 218, and may include a gate electrode 204, an active layer 210, a source electrode 214, and a drain electrode 216.

Within the pixel regions P, which are defined by the plurality of gate lines and data lines 202 and 218, a plurality of red (R), green (G), and blue (B) color filters 238a, 238b, and 238c may be located therein. In addition, a double-layered pixel electrode including first and second pixel electrodes 248 and 250 may be disposed corresponding to each pixel region P. The first pixel electrode 248 and the second pixel electrode 250 may have similar shapes. Alternatively, the first pixel electrode 248 and the second pixel electrode 250 may have dissimilar shapes. Although not shown, the first pixel electrode 248 may be disposed beneath the color filter 238 and may contact the drain electrode 216, and the second pixel electrode 250 may be disposed on the color filter 238 and may contact the first pixel electrode 248. For example, the color filter 238 may be located between the first and second pixel electrodes 248 and 250, and the second pixel electrode 250 may electrically contact the drain electrode 216 through the first pixel electrode 248.

In FIG. 7, a storage capacitor $C_{ST}$ may be included within a portion of the gate line 202 and a storage metal layer 222. Accordingly, the portion of the gate line 202 may function as a first electrode of the storage capacitor $C_{ST}$, and the storage metal layer 222 may function as a second electrode of the storage capacitor $C_{ST}$. In addition, the first and second pixel electrodes 248 and 250 may electrically contact the storage metal layer 222 so that they are electrically connected to the storage capacitor $C_{ST}$ in parallel.

Similarly to the array substrate 200 of FIG. 3, which has a color filter-on-thin film transistor (COT) structure, a black matrix 228 and the color filters 238 may be formed on the array substrate 200, wherein the black matrix 228 may be disposed to correspond to the thin film transistors T, the gate lines 202, and the data lines 218 to prevent light leakage in the LCD device. The black matrix 228 may include opaque organic material(s), thereby blocking the light incident to the thin film transistors T and protecting the thin film transistors T from external impact.

In addition to the COT structure of FIG. 7, a double-layered gate pad terminal including a first gate pad terminal 252 and a second gate pad terminal 254 may be disposed over the gate pad 206 and may electrically communicate with the gate pad 206. Furthermore, a double-layered data pad terminal including a first data pad terminal 256 and a second data pad terminal 258 may be disposed over the data pad 220, and a first color filter pattern 240 may be interposed between the first and second gate pad terminals 252 and 254 and a second color filter pattern 242 may be interposed between the first and second data pad terminals 256 and 258. Accordingly, the first and second color filter patterns 240 and 242 may prevent developer, used to pattern the color filters 238, from adversely affecting the gate and data pads 206 and 220. Since the developer used to pattern the color filters 238 may cause Galvanic corrosion between the pad terminals 252, 254, 256, and 258 and the pads 206 and 220, the color filter patterns 240 and 242 may be disposed over the gate and data pads 206 and 220, especially between the first and second gate pad terminals 252 and 254 and between the first and second data pad terminals 256 and 258, respectively.

FIGS. 8A-8G are cross sectional views along VIII-VIII of FIG. 7 showing exemplary fabrication process steps according to the present invention, FIGS. 9A-9G are cross sectional views along IX-IX of FIG. 7 showing exemplary fabrication process steps according to the present invention, and FIGS. 10A-10G are cross sectional views along X-X of FIG. 7 showing exemplary fabrication process steps according to the present invention.

Figure 8A:
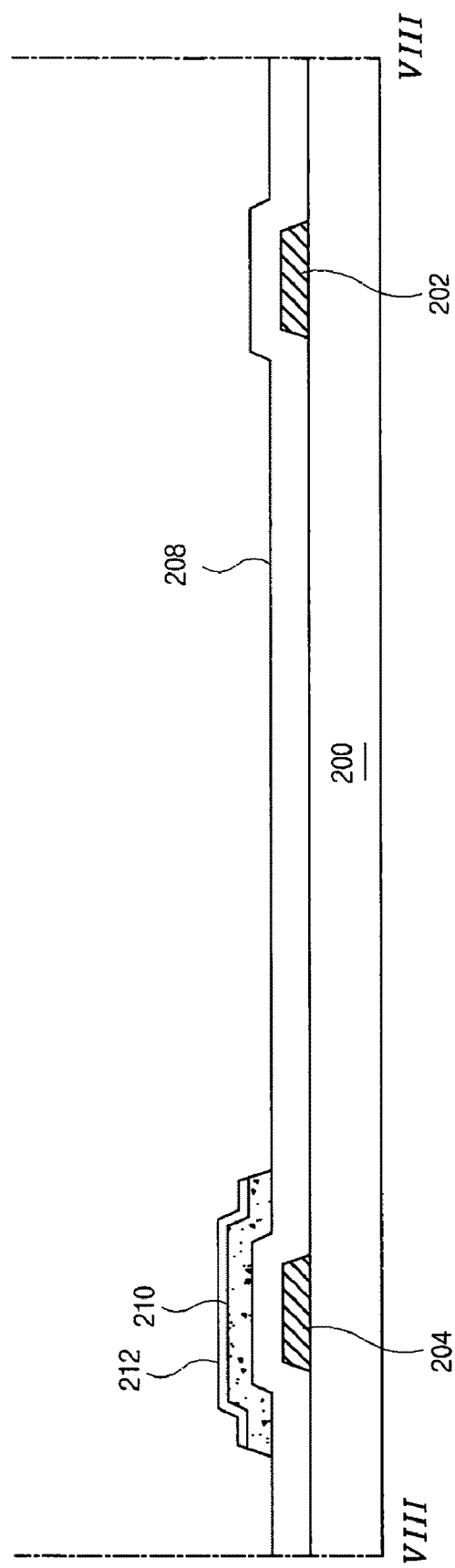
Figure 9A:
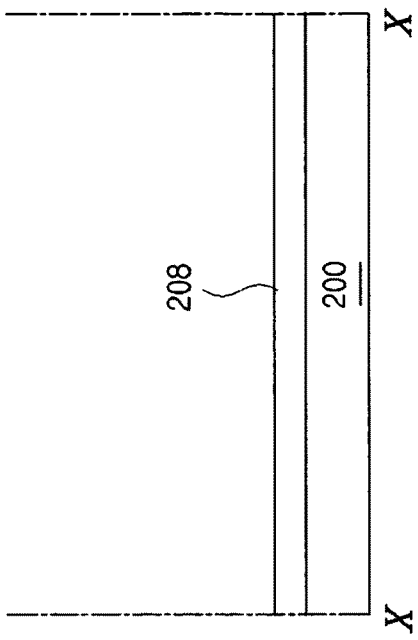
Figure 10A:
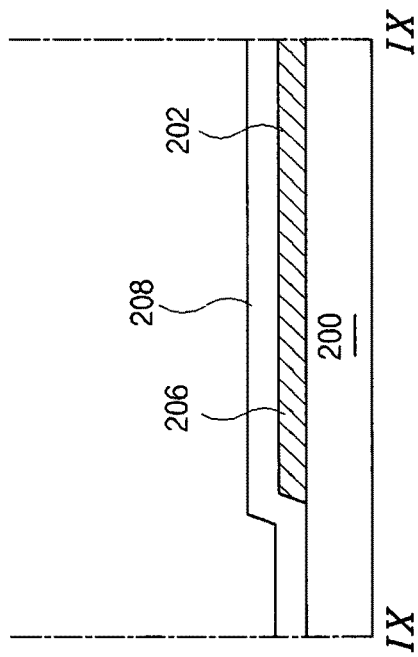

In FIGS. 8A, 9A, and 10A, a first metal layer may be deposited onto a surface of a substrate 200, and then patterned using a mask process to form a gate line 202, a gate electrode 204, and a gate pad 206. Accordingly, the gate pad 206 may be disposed at the ends of the gate line 202, and the gate electrode 204 may extend from the gate line 202. In addition, the first metal layer may include aluminum-based material(s) having low electrical resistance in order to prevent signal delay. Since the aluminum-based material(s) have poor corrosion resistance to the developing solution used to pattern the color filters, the aluminum-based material(s) may be damaged by the developing solution during patterning of the color filters. For example, when a transparent gate pad terminal is formed on the gate pad 206, the developing solution may cause Galvanic corrosion between the transparent gate pad terminal and the gate pad 206; thereby eroding the gate pad 206.

After forming the gate line 202, the gate electrode 204, and the gate pad 206 on the substrate 200, a gate insulation layer 208 (or a first insulating layer) may be formed on the substrate 200 to cover the gate line 202, the gate electrode 204, and the gate pad 206. The gate insulation layer 208 may include inorganic material(s), such as silicon nitride ($SiN_x$) and silicon oxide ($SiO_2$). Next, an intrinsic amorphous silicon layer (e.g., a-Si:H) and a doped amorphous silicon layer (e.g., $n^+$a-Si:H) may be sequentially deposited along an entire surface of the gate insulation layer 208 and may be simultaneously patterned using a mask process to form an active layer 210 and an ohmic contact layer 212. The ohmic contact layer 212 may be located on the active layer 210 over the gate electrode 204.

Figure 8B:
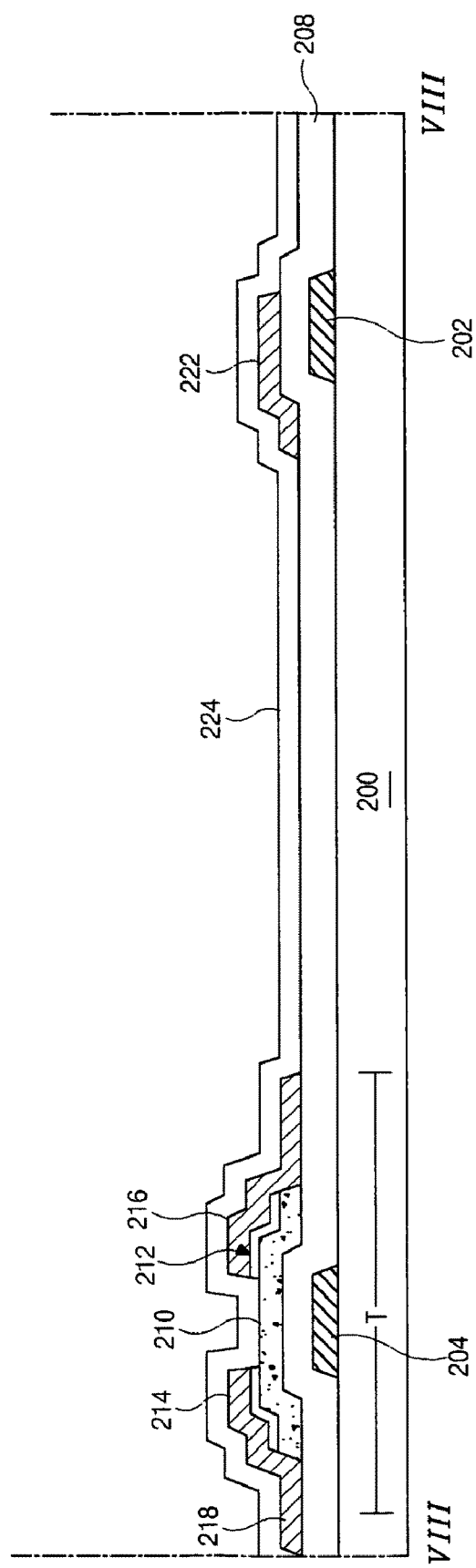
Figure 9B:
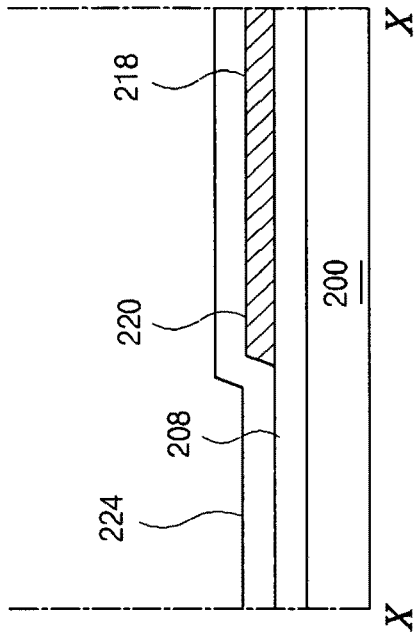
Figure 10B:
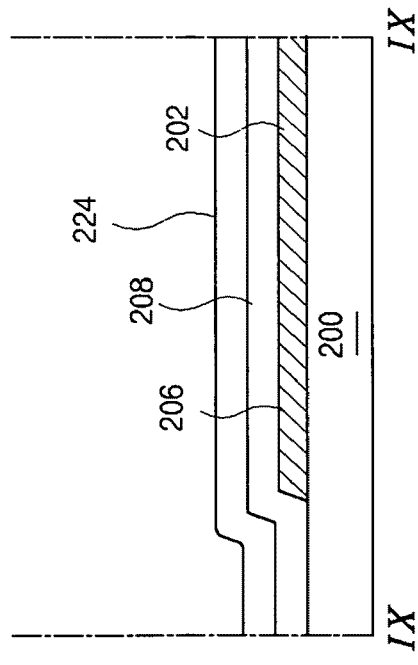

In FIGS. 8B, 9B, and 10B, after forming the active layer 210 and the ohmic contact layer 212, a second metal layer may be deposited over the substrate 200, and then patterned using a mask process to form a source electrode 214, a drain electrode 216, a data line 218, a storage metal layer 222, and a data pad 220. The second metal layer may include at least one of chromium (Cr), molybdenum (Mo), tungsten (W), titanium (Ti), copper (Cu), and an alloy of any combination thereof. In addition, the source electrode 214 may extend from the data line 218 and may contact one portion of the ohmic contact layer 212, the drain electrode 216 may be spaced apart from the source electrode 214 and may contact another portion of the ohmic contact layer 212, the storage metal layer 222 may overlap a portion of the gate line 202, and the data pad 220 may be connected to the data line 218 at the ends of the data line 218.

Next, a portion of the ohmic contact layer 212 between the source and drain electrodes 214 and 216 may be etched using the source and drain electrodes 214 and 216 as masks, thereby forming a thin film transistor T and a storage capacitor $C_{ST}$ (in FIG. 7). For example, as shown in FIG. 7, the thin film transistor T may include the gate electrode 204, the active layer 210, the ohmic contact layer 212, the source electrode 214, and the drain electrode 216, and the storage capacitor $C_{ST}$ (in FIG. 7) may include the gate line 202, the storage metal layer 222, and the interposed first insulator 208.

Then, a second insulating layer 224 may be deposited along an entire surface of the substrate 200 to cover the patterned second metal layer, and may include silicon nitride ($SiN_x$) or silicon oxide ($SiO_2$). The second insulating layer 224 may enhance adhesion of a subsequently-formed organic layer and may prevent poor contact between the active layer 210 and the organic layer. Alternatively, if poor contact does not occur between the active layer 210 and the subsequently-formed organic material, the second insulating layer 220 may not be necessary.

Figure 8C:
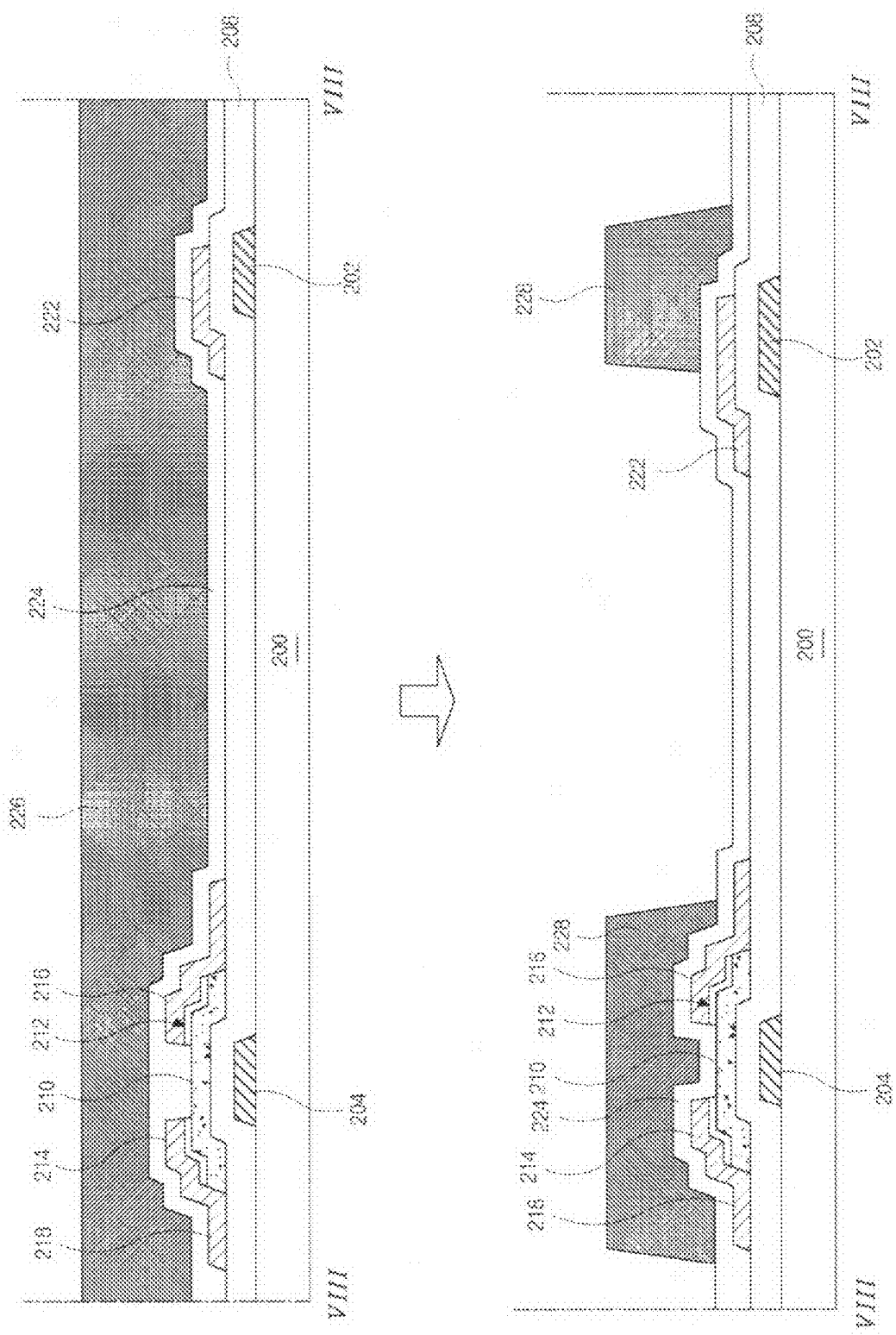

In FIGS. 8C, 9C, and 10C, an opaque organic material 226 having a low dielectric constant may be deposited on the second insulating layer 224, and may have a black color to function as a black matrix. The opaque organic material 226 may be formed on the second insulating layer 224 by patterning using mask process, wherein a black matrix 228 may be formed over the thin film transistor T, the data line 218, and the gate line 202 that are disposed within a display area. Since the black matrix 228 may include organic material(s) and may cover a portion of the storage metal layer 222, it may protect the thin film transistor T and the storage capacitor.

Figure 8D:
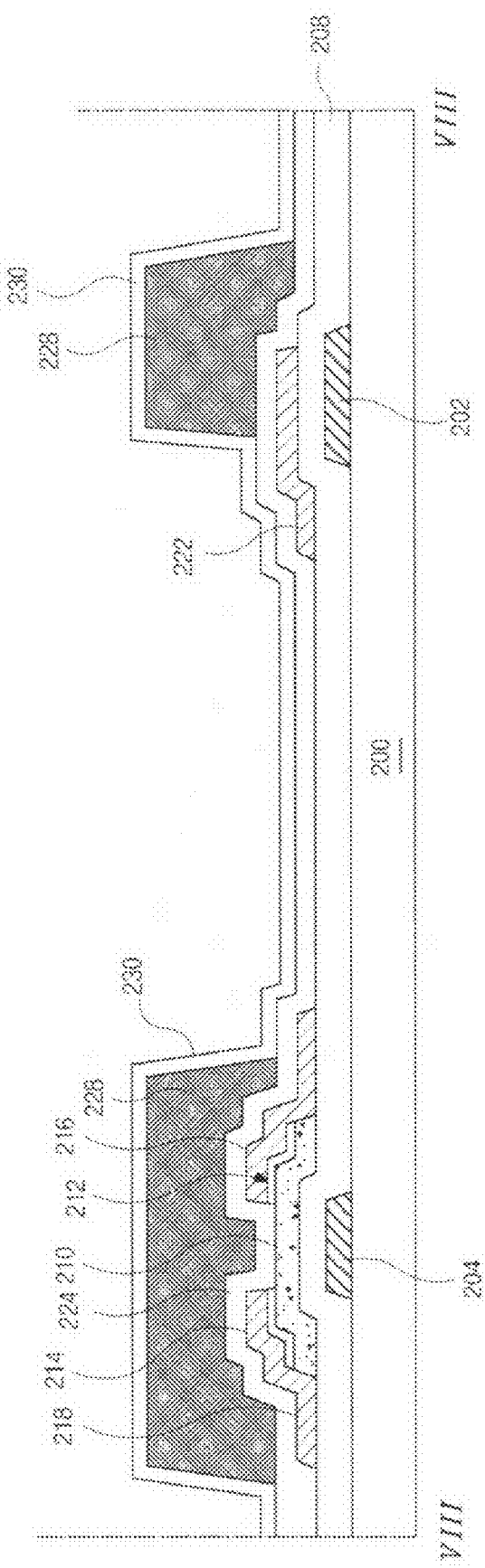

In FIGS. 8D, 9D, and 10D, a third insulating layer 230 may be formed along an entire surface of the substrate 200 to cover the black matrix 228. The third insulating layer 230 may include inorganic insulating material(s), such as silicon nitride ($SiN_x$) or silicon oxide ($SiO_2$).

Figure 8E:
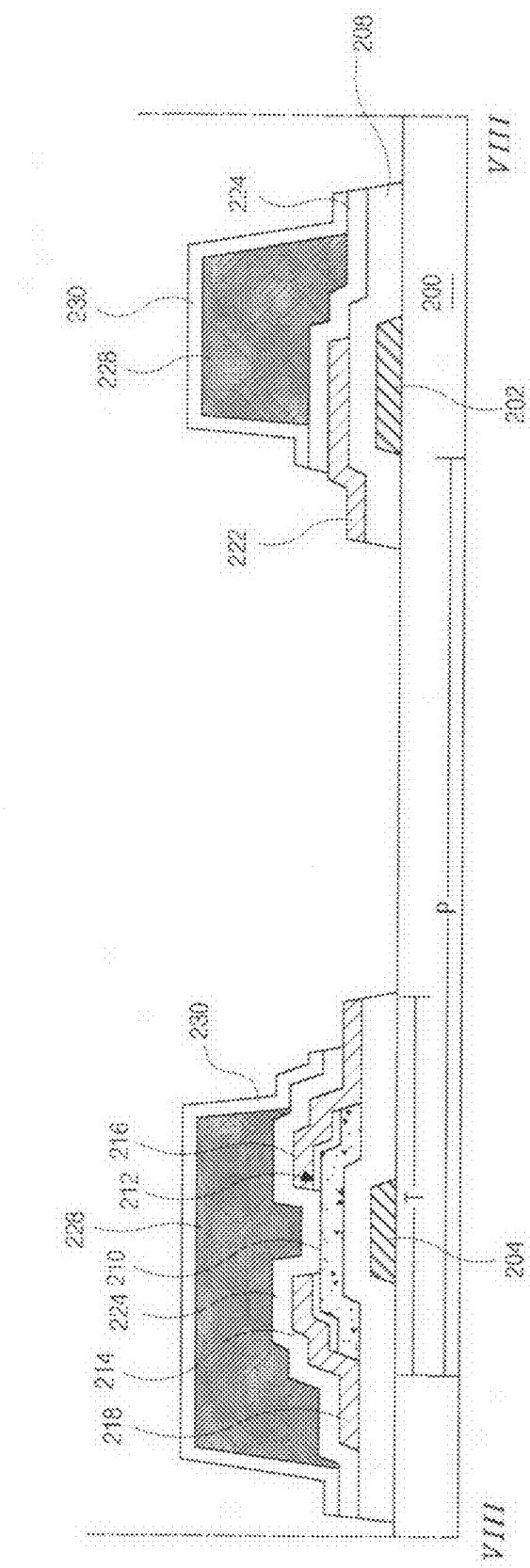

In FIGS. 8E, 9E, and 10E, the first, second, and third insulating layers 208, 224, and 230 may be simultaneously patterned within the pixel region P using a mask process. Accordingly, an end side portion of the drain electrode 206 and an end side portion of the storage metal layer 222 may be exposed. During patterning of the first, second, and third insulating layers 208, 225, and 230 within the pixel region P, a portion of the gate pad 206 may be exposed to form a gate pad contact hole 232. Furthermore, a portion of the data pad 220 may also be exposed by patterning of the second and third insulating layers 224 and 230 over the data pad 220, thereby forming a data pad contact hole 234.

Although FIG. 8E shows that the substrate 200 may be exposed by patterning the first insulating layer 208, portions of the first insulating layer 208 may remain such that the second and third insulating layers 224 and 230 may be patterned to expose the side portions of the drain electrode 206 and storage metal layer 222. Furthermore, the remaining portions of the first insulating layer 206 on the substrate 200 may control a height of a subsequently-formed color filter. In addition, the insulating layers disposed on and over the gate and data pad 206 and 220 may also be patterned to form the gate and data pad contact holes 232 and 234 during patterning of the first, second, and third insulating layers 208, 224, and 230 within the pixel region P, as shown in FIGS. 9E and 10E.

Figure 9F:
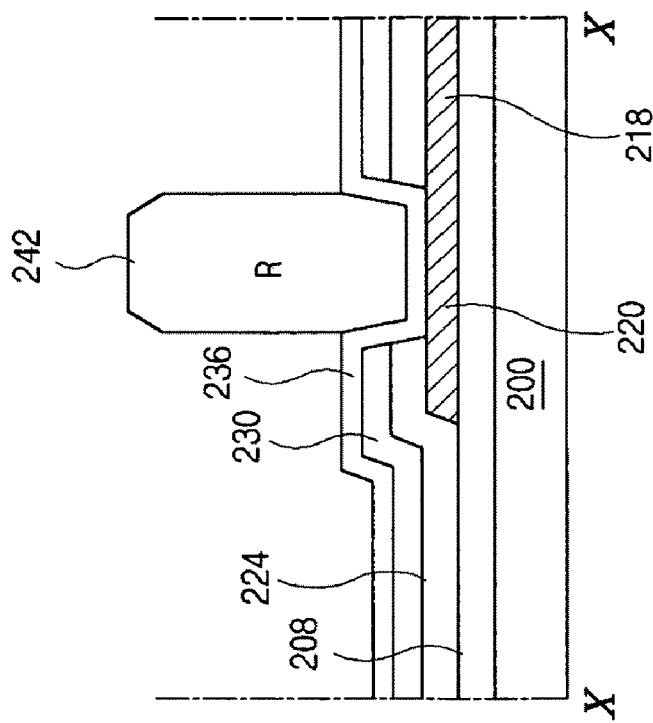
Figure 10F:
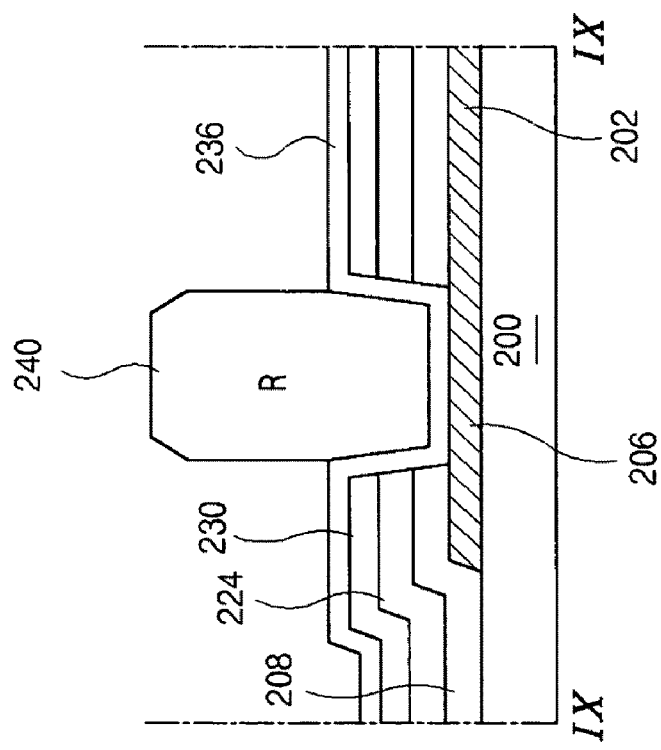

In FIGS. 8F, 9F, and 10F, show a step of forming a first transparent electrode layer 236, color filters 238, and first and second color filter patterns on the substrate 200. For example, a first transparent electrode layer 236 of indium tin oxide (ITO) or indium zinc oxide (IZO) may be first deposited along an entire surface of the substrate 200 to cover the patterned third insulating layer 230 and to contact the exposed side portions of the drain electrode 206 and storage metal layer 222. The first transparent electrode layer 236 may also contact the gate pad 206 and the data pad 220, respectively, through the gate pad contact hole 232 and through the data pad contact hole 234.

Then, color resin may be formed on the first pixel electrode 238 and then developed to form color filters 238a, 238b, and 238c having red (R), green (G), and blue (B) colors, respectively. The red, green, and blue color filters 238a, 238b, and 238c may be formed in sequential order by forming and developing red, green, and blue color resin. When one of the color filter 238a, 238b, and 238c is formed, for example, when the red (R) color filter 238a is formed, first and second color filter patterns 240 and 242 may also be formed over the gate and data pads 206 and 220, respectively. Specifically, the first color filter pattern 240 may be formed to correspond to and fit into the gate pad contact hole 232, and the second color filter pattern 242 may be formed to correspond to and fit into the data pad contact hole 234.

Figure 8G:
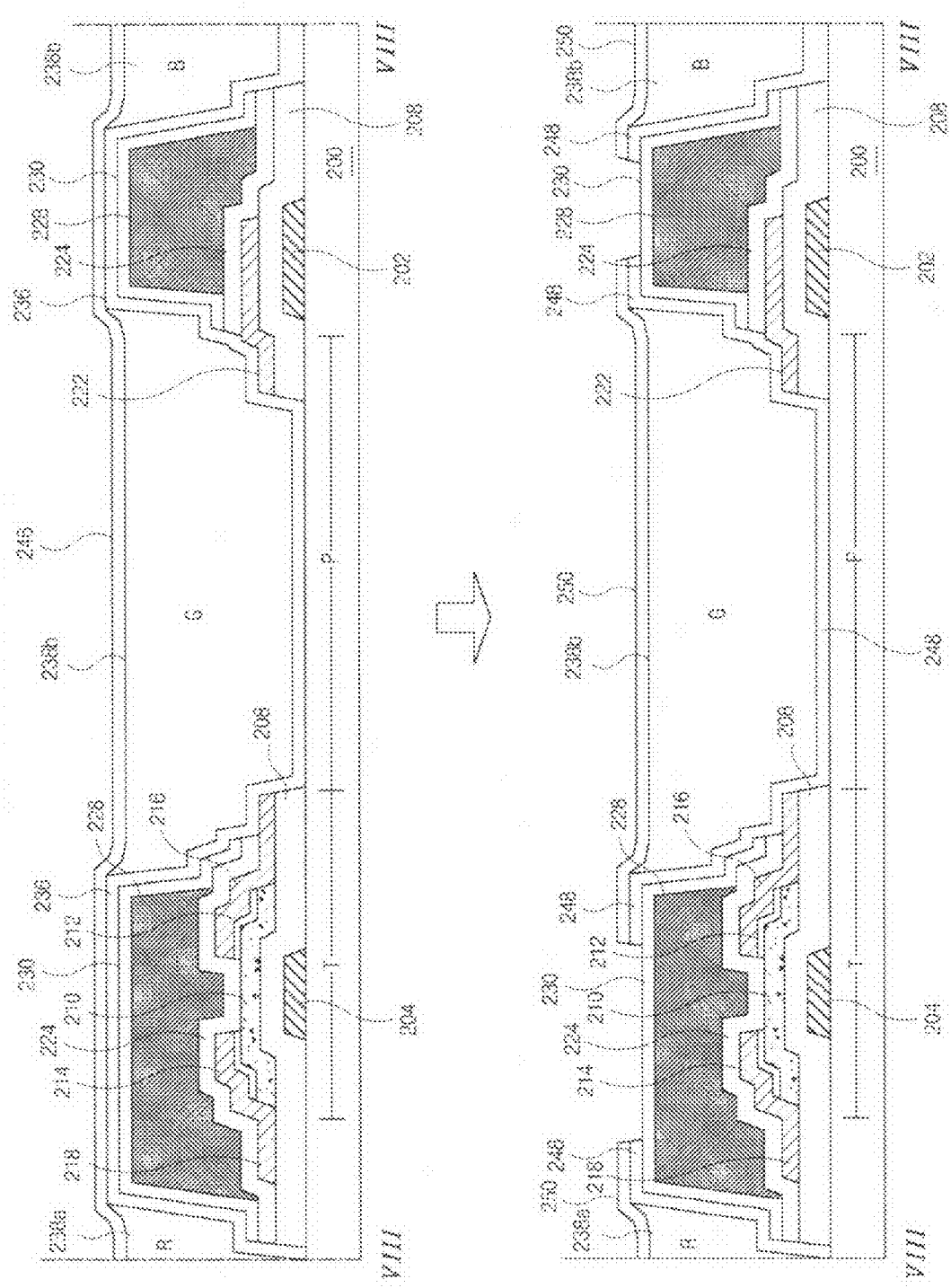
Figure 9G:
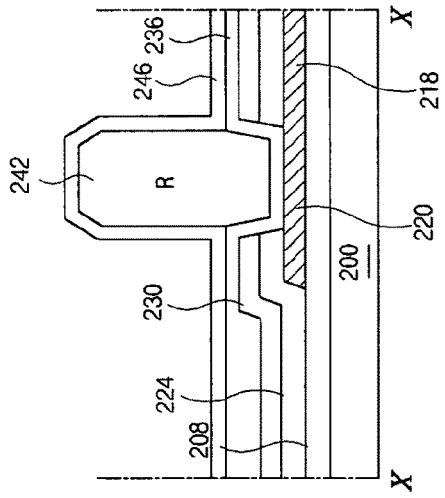
Figure 10G:
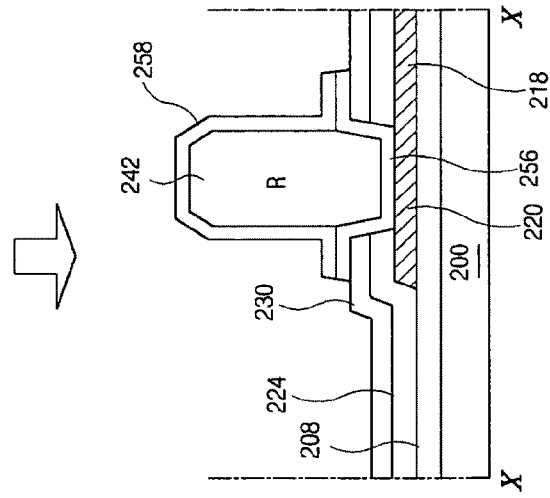

In FIGS. 8G, 9G, and 10G, a second transparent electrode layer 246 may be formed along an entire surface of the substrate 200 so as to contact the color filters 238 and the exposed portions of the first transparent electrode layer 236. The second transparent electrode layer 246 may includes indium tin oxide or indium zinc oxide similarly to the first transparent electrode layer 236. As shown in FIG. 8G, the second transparent electrode layer 246 may contact the first transparent electrode layer 236 at both sides of each color filter 238.

In FIGS. 8G, 9G, and 10G, the first and second transparent electrode layers 236 and 246 may be simultaneously patterned to form a double-layered pixel electrode (i.e., sandwich pixel electrode) that may include a first pixel electrode 248 and a second pixel electrode 250. The first and second transparent electrode layers 236 and 246 may be simultaneously patterned using a common mask so that the sandwich pixel electrode may be formed corresponding to each pixel region P. Alternatively, the first transparent electrode layer 236 may be first patterned, the color filters formed thereon, and then the second transparent electrode layer 246 may be patterned. Each color filter 238 may be interposed into the sandwich pixel electrode so that it is in between the first and second pixel electrodes 248 and 250. Since the second pixel electrode 250 may contact the first pixel electrode 248 at both sides of the color filter 238, the sandwich pixel electrode may contact the thin film transistor T and may be connected in parallel to the storage capacitor $C_{ST}$.

During formation of the sandwich pixel electrode including of the first and second pixel electrodes 248 and 250, the first and second pixel electrode layers 236 and 246 in the gate and data pad regions may also be patterned to form a double-layered gate pad terminal, which may include first and second gate pad terminals 252 and 254, and a double-layered data pad terminal, which may include first and second data pad terminals 256 and 258.

In the double-layered gate pad terminal, the first color filter pattern 240 may be interposed between the first and second gate pad terminals 252 and 254, and the second gate pad terminal 254 may contact the first gate pad terminal 252 around the first color filter pattern 240. Since the first gate pad terminal 252 may contact the gate pad 206, the second gate pad terminal 254 may also be in electrical communication with the gate pad 206.

In the double-layered data pad terminal, the second color filter pattern 242 may be interposed between the first and second data pad terminals 256 and 258, and the second data pad terminal 258 may contact the first data pad terminal 256 around the second color filter pattern 242. Since the first data pad terminal 256 may contact the data pad 220, the second gate pad terminal 258 may also be in electrical communication with the data pad 220.

Accordingly, throughout the fabrication process shown in FIGS. 8A-8G, 9A-9G, and 10A-10G, the array substrate may have the color filter patterns disposed over the gate and data pads. In addition, the color filters 238a, 238b, and 238c, which may display a full spectrum of colors, may be formed within the pixel regions P on the first transparent electrode layer 236. Accordingly, when developing the color resin, the first transparent electrode layer 236 may prevent the developing solution (i.e., a developer) used to pattern the color filters 238a, 238b, and 238c from penetrating into other underlying metallic layers. In step portions of the gate line 202, the gate electrode 204, and the gate pad 206, the gate insulation layer 208 and other insulating layers may be formed having defects, such as pinholes and cracks. Accordingly, when developing the color filters 238a, 238b, and 238c, the developer may penetrate into the first, second, and third insulation layers 208, 224, and 230, thereby deteriorating the gate line 202, the gate electrode 204, and the gate pad 206 that are formed of aluminum-based material(s). By forming the first transparent electrode layer 236, deterioration of the gate line 202, the gate electrode 204, and the gate pad 206 may be prevented and process stability may be achieved.

Furthermore, since the color filter patterns 240 and 242 may be formed between the first and second pad electrodes over the gate and data pads 206 and 220, the color filter patterns may function as an impact absorber when external driving circuits are attached to the gate and data pad terminals.

Figure 11A:
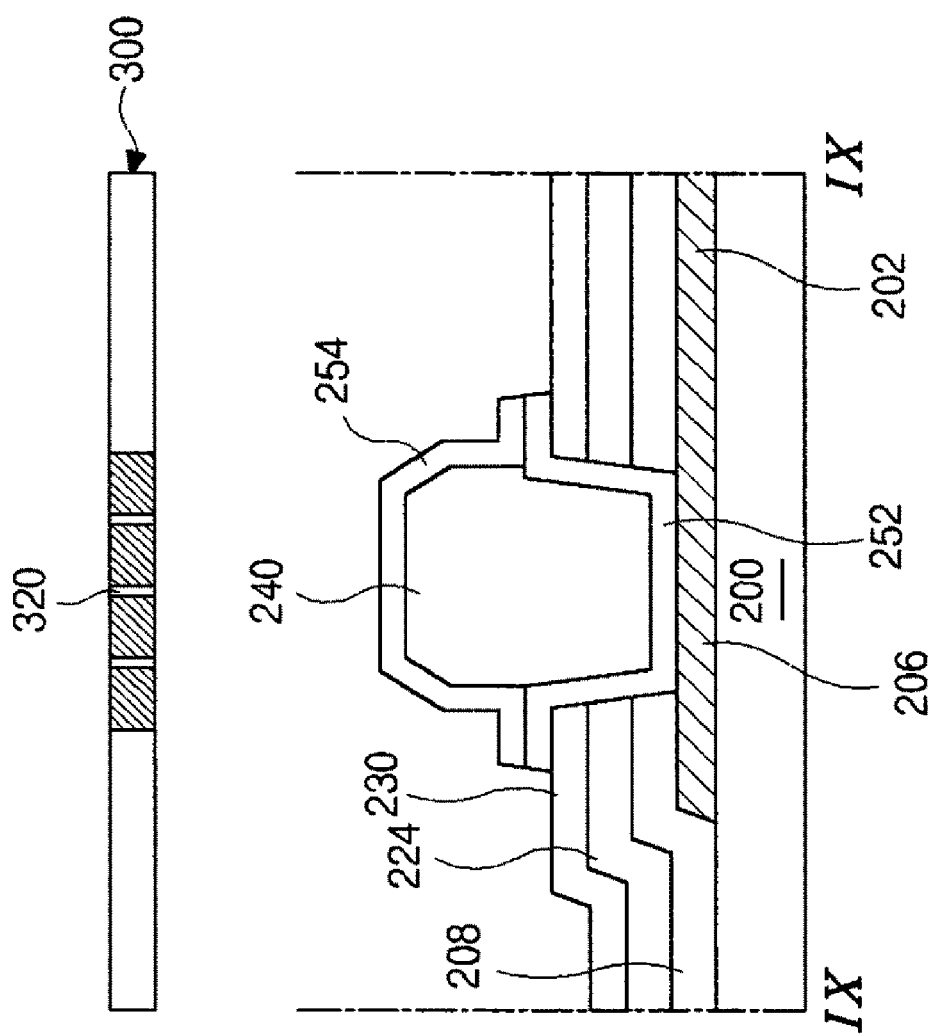
FIGS. 11A and 11B are cross sectional views of exemplary gate and data pad regions according to the present invention.
Figure 11B:
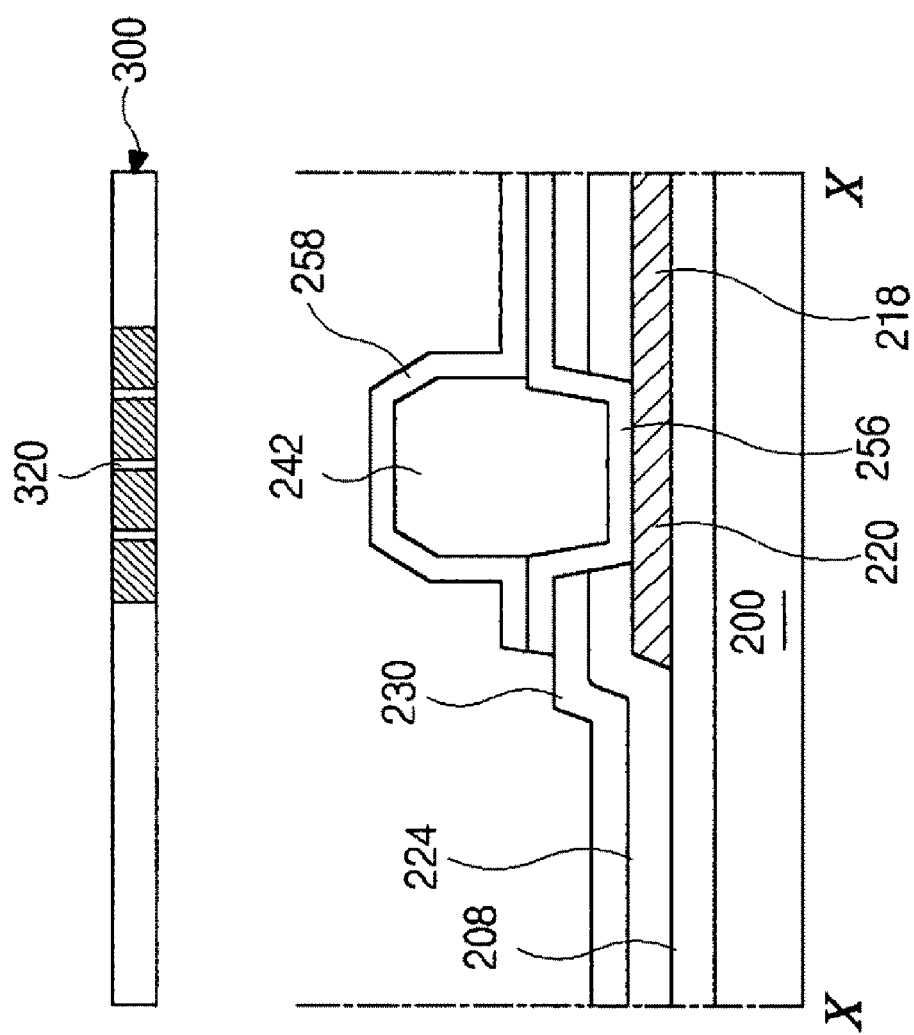

FIGS. 11A and 11B are cross sectional views of exemplary gate and data pad regions according to the present invention. In FIGS. 11A and 11B, a mask 300 may include a plurality of slits 320 disposed at locations corresponding to color filter patterns 240 and 242. Accordingly, during a mask process for forming the color filters and the color filter patterns, light passing through the slits may be diffracted, thereby slightly exposing portions for the color filter patterns. During a developing process after the exposure process, the slightly exposed portions may be partially developed, thereby forming the color filter patterns having a relatively short height.

Figure 12A:
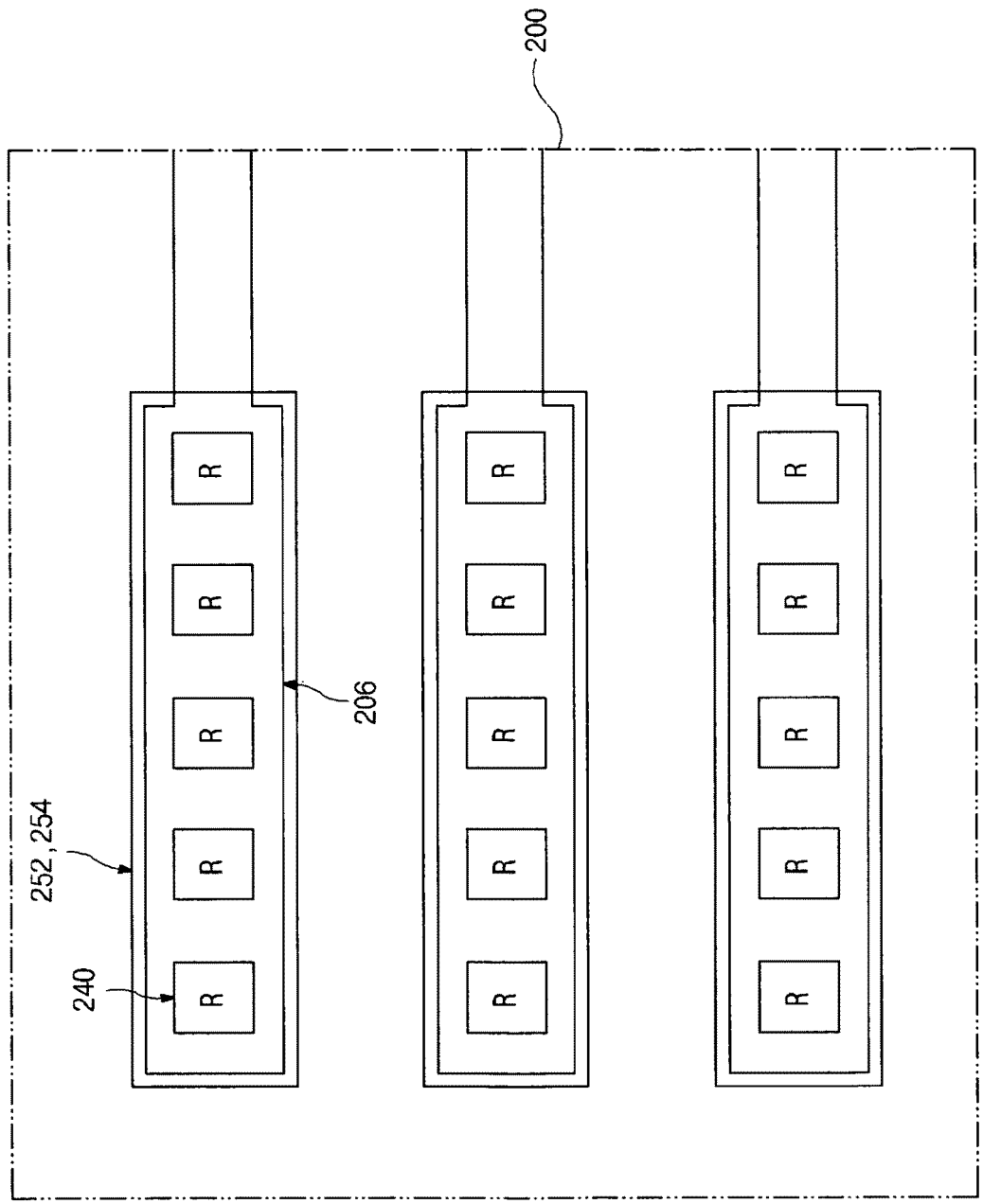
FIG. 12A is a plan view of exemplary gate pads according to the present invention.
Figure 12B:
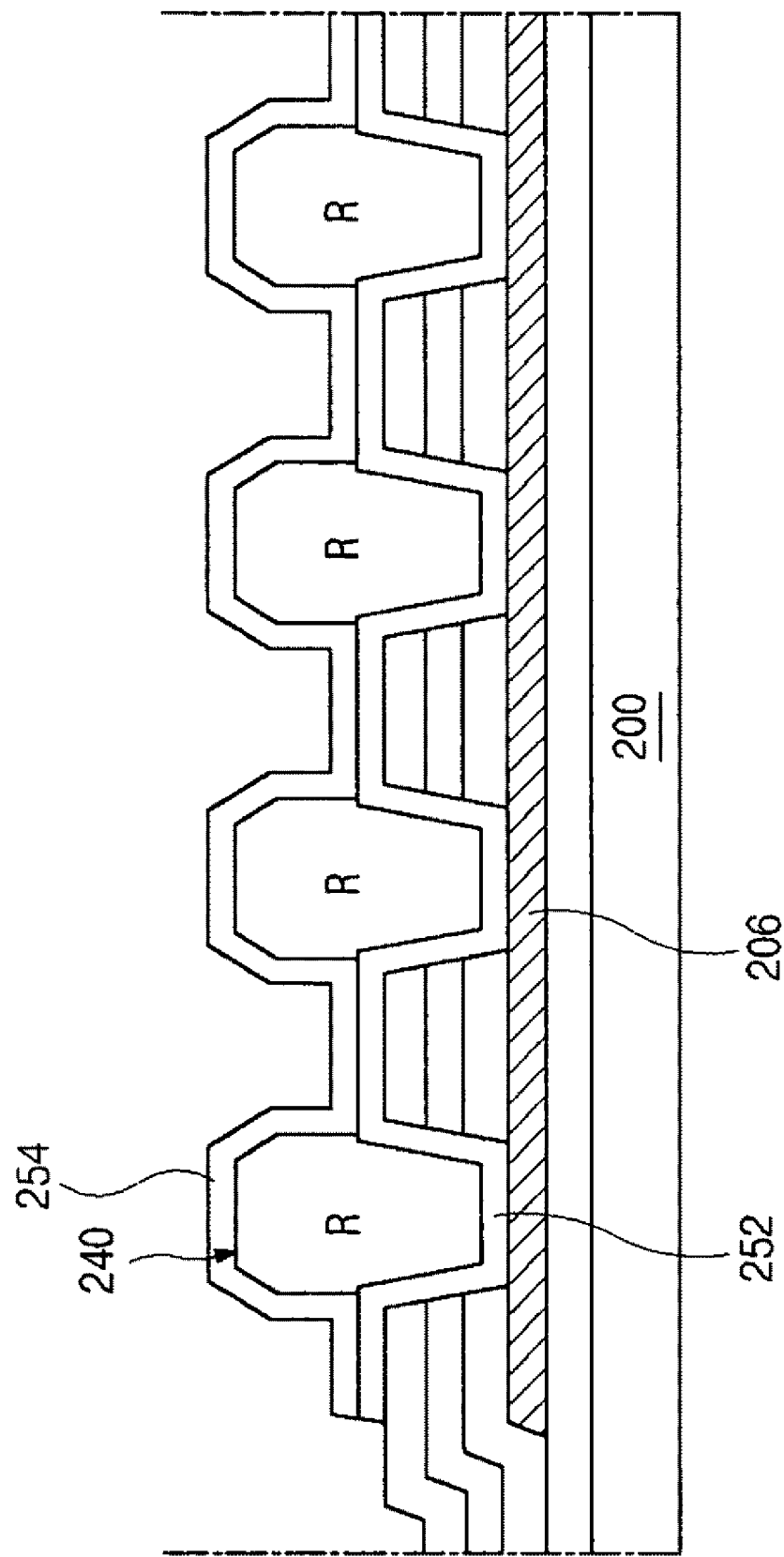
FIG. 12B is a sectional view of FIG. 12A according to the present invention.

FIG. 12A is a plan view of exemplary gate pads according to the present invention, and FIG. 12B is a sectional view of FIG. 12A according to the present invention. In FIGS. 12A and 12B, a plurality of gate pad contact holes may be formed within a gate pad region to expose portions of gate pads 206, wherein color filter patterns 240 may be disposed corresponding to each gate pad contact hole. First gate pad terminals 252 may be formed to contact the gate pads 206 through the plurality of gate pad contact holes, and the plurality of color filter patterns 240 may be formed on the gate pad terminal 252 to correspond to and fix into the gate pad contact holes. In addition, second gate pad terminals 254 may be formed to cover the plurality of color filter patterns and to contact the exposed portions of the first gate pad terminals 252. Accordingly, the first and second gate pad terminals 252 and 254 may embrace the color filter patterns 240. Moreover, the structure of the gate pad region may be applied to data pad regions.

The structure of the gate pad, as shown in FIGS. 12A and 12B, may provide an enlarged contact area between the color filter patterns and the gate pad terminals, thereby increasing adhesion between the color filter patterns and the gate pad terminals. Furthermore, the structure of FIGS. 12A and 12B may provide enlarged contact areas of the gate pad terminal with external diving circuits that electrically communicate with the gate pads.

According to the present invention, since the black matrix and color filters may be formed on the array substrate, an aligning margin between lower and upper substrates may not be necessary, thereby increasing an aperture ratio. Furthermore, the gate pad may be well protected from a developer used to pattern the color filters, thereby stabilizing the fabrication process of the array substrate, simplifying the fabrication process, and reducing production costs.

It will be apparent to those skilled in the art that various modifications and variations can be made in the array substrate for liquid crystal display device and method of fabricating the same of the present invention without departing from the spirit or scope of the inventions. Thus, it is intended that the present invention covers the modifications and variations of this invention provided they come within the scope of the appended claims and their equivalents.

What is claimed is:

1. A method of forming an array substrate having a color filter-on-thin film transistor (COT) structure for a liquid crystal display device, comprising:
    forming a gate line on a substrate along a transverse direction, a gate pad at one end of the gate line, and a gate electrode extending from the gate line;
    forming a first gate insulating layer on the substrate to cover the gate line, the gate pad, and the gate electrode;
    forming an active layer of intrinsic amorphous silicon and an ohmic contact layer of extrinsic amorphous silicon layer in series on the first gate insulating layer over the gate electrode;
    forming a data line, a data pad, a source electrode, and a drain electrode, the data line disposed perpendicularly crossing the gate line and defining a pixel region, the data pad disposed at one end of the data line, the source electrode extending from the data line on a first portion of the ohmic contact layer, and the drain electrode spaced apart from the source electrode on a second portion of the ohmic contact layer to form the thin film transistor;
    forming a second insulating layer over an entire surface of the substrate to cover the thin film transistor;
    forming a black matrix on the second insulating layers to cover the thin film transistor, the gate line, and the data line except a first portion of the drain electrode;
    forming a third insulating layer over an entire surface of the substrate to cover the black matrix;
    patterning the first, second, and third insulating layers to expose the first portion of drain electrode;
    forming a first transparent electrode layer over an entire surface of the substrate to cover the patterned third insulating layer and contacting the exposed portion of the drain electrode;
    forming a color filter on the first transparent electrode layer within the pixel region;
    forming a second transparent electrode layer over an entire surface of the substrate to cover the color filter and the first transparent electrode layer;
    patterning the first and second transparent electrode layers to form first and second pixel electrodes; and
    patterning portions of the first, second, and third insulating layer over the gate and data pads to form gate and data pad contact holes, respectively, after forming the first and second pixel electrodes.

2. The method according to claim 1, wherein the thin film transistor includes the gate electrode, the active layer, the ohmic contact layer, the source electrode, and the drain electrode.

3. The method according to claim 1, wherein the first and second pixel electrodes form a sandwich pixel electrode.

4. The method according to claim 1, wherein the color filter is interposed between the first and second pixel electrodes.

5. The method according to claim 1, wherein the gate pad contact hole exposes a second portion of the gate pad, and the data pad contact hole exposes a third portion of the data pad.

6. The method according to claim 1, wherein the second insulating layer is interposed between the thin film transistor and the black matrix.

7. The method according to claim 1, wherein the first to third insulating layers include one of silicon nitride and silicon oxide.

8. The method according to claim 1, wherein the first and second transparent electrode layers includes at least one of indium tin oxide and indium zinc oxide.

9. The method according to claim 1, wherein the color filter includes at least one of red, green, and blue colors.

10. The method according to claim 1, wherein forming the data line includes forming a storage metal layer on the first insulating layer over the gate line.

11. The method according to claim 10, wherein the second and third insulating layers expose a fifth portion of the storage metal layer.

12. The method according to claim 11, wherein the first pixel electrode contacts the exposed fifth portion of the storage metal layer.

13. The method according to claim 10, wherein the storage metal layer and a portion of the gate line constitute a storage capacitor with the first insulating layer interposed between the storage metal layer and the gate line.

14. The method according to claim 1, wherein the first pixel electrode directly contacts the substrate.

15. A method of forming an array substrate having a color filter-on-thin film transistor (COT) structure for a liquid crystal display device, comprising:

forming a gate line on a substrate along a transverse direction, a gate pad at one end of the gate line, and a gate electrode extending from the gate line;

forming a first gate insulating layer on the substrate to cover the gate line, the gate pad, and the gate electrode;

forming an active layer of intrinsic amorphous silicon and an ohmic contact layer of extrinsic amorphous silicon layer in series on the first gate insulating layer over the gate electrode;

forming a data line, a data pad, a source electrode, and a drain electrode, the data line disposed perpendicularly crossing the gate line and defining a pixel region, the data pad disposed at one end of the data line, the source electrode extending from the data line on a first portion of the ohmic contact layer, and the drain electrode spaced apart from the source electrode on a second portion of the ohmic contact layer to form a thin film transistor at a crossing of the gate and data lines;

forming a second insulating layer over an entire surface of the substrate to cover the thin film transistor;

forming a black matrix on the second insulating layer and over the thin film transistor, the gate line, and the data line except a first portion of the drain electrode;

forming a third insulating layer over an entire surface of the substrate to cover the black matrix;

patterning the first, second, and third insulating layers to expose the first portion of drain electrode and to form a gate pad contact hole to the gate pad and a data pad contact hole to the data pad;

forming a first transparent electrode layer over an entire surface of the substrate to cover the patterned third insulating layer, the first transparent electrode layer contacting the exposed first portion of the drain electrode, the gate pad through the gate pad contact hole, and the data pad through the data pad contact hole;

forming a color filter and first and second color filter patterns on the first transparent electrode layer, the color filter disposed within the pixel region, and the first and second color filter patterns disposed over the gate and data pads, respectively;

forming a second transparent electrode layer over an entire surface of the substrate to cover the color filter, the first and second color filter patterns, and the first transparent electrode layer; and patterning the first and second transparent electrode layers to form first and second pixel electrodes, first and second gate pad terminals, and first and second data pad terminals.

16. The method according to claim 15, wherein the thin film transistor includes the gate electrode, the active layer, the ohmic contact layer, the source electrode, and
the drain electrode.

17. The method according to claim 15, wherein the first and second pixel electrodes form a sandwich pixel electrode.

18. The method according to claim 15, wherein the color filter is interposed between the first and second pixel electrodes.

19. The method according to claim 15, wherein the first color filter pattern is interposed between the first and second gate pad terminals, and the second color filter pattern is interposed between the first and second data pad terminals.

20. The method according to claim 15, wherein patterning the first, second, and third insulating layers forms plural gate pad contact holes to the gate pad and plural data pad contact holes to the data pad.

21. The method according to claim 20, wherein the first color filter pattern is disposed within each gate pad contact hole.

22. The method according to claim 15, wherein forming the first and second color filer patterns includes a mask having a plurality of slits.

23. The method according to claim 22, wherein light passing through the plurality of slits is diffracted to form the first and second color filter patterns having a short height.

24. The method according to claim 15, wherein the second insulating layer is interposed between the thin film transistor and the black matrix.

25. The method according to claim 15, wherein the first, second, and third insulating layers include at least one of silicon nitride and silicon oxide.

26. The method according to claim 15, wherein the first and second transparent electrode layers include at least one of indium tin oxide and indium zinc oxide.

27. The method according to claim 15, wherein the color filter and the first and second color filter patterns include at least one of red, green, and blue colors.

28. The method according to claim 15, wherein forming the data line includes forming a storage metal layer on the first insulating layer over the gate line.

29. The method according to claim 28, wherein the second and third insulating layers expose a second portion of the storage metal layer.

30. The method according to claim 29, wherein the first pixel electrode contacts the exposed second portion of the storage metal layer.

31. The method according to claim 28, wherein the storage metal layer and a third portion of the gate line form a storage capacitor with the first insulating layer interposed between the storage metal layer and the gate line.

32. The method according to claim 15, wherein the first pixel electrode directly contacts the substrate.

* * * * *

UNITED STATES PATENT AND TRADEMARK OFFICE
CERTIFICATE OF CORRECTION

| | | |
|---|---|---|
| PATENT NO. | : 8,035,766 B2 | Page 1 of 1 |
| APPLICATION NO. | : 12/591897 | |
| DATED | : October 11, 2011 | |
| INVENTOR(S) | : Woong-Kwon Kim et al. | |

It is certified that error appears in the above-identified patent and that said Letters Patent is hereby corrected as shown below:

Title page Item [54] on the face of the patent. The title should be:

METHOD OF FORMING ARRAY SUBSTRATE FOR LCD HAVING A STEP OF FORMING A BLACK MATRIX ON A SECOND INSULATING LAYER TO COVER A DATE LINE EXCEPT A FIRST PORTION OF A DRAIN ELECTRODE

Signed and Sealed this
Fourteenth Day of August, 2012

David J. Kappos
*Director of the United States Patent and Trademark Office*

UNITED STATES PATENT AND TRADEMARK OFFICE
CERTIFICATE OF CORRECTION

PATENT NO.         : 8,035,766 B2                                        Page 1 of 1
APPLICATION NO.    : 12/591897
DATED              : October 11, 2011
INVENTOR(S)        : Woong-Kwon Kim et al.

It is certified that error appears in the above-identified patent and that said Letters Patent is hereby corrected as shown below:

Title page Item [54] on the face of the patent and at Column 1, lines 1 and 2. The title should be:

METHOD OF FORMING ARRAY SUBSTRATE FOR LCD HAVING A STEP OF FORMING A BLACK MATRIX ON A SECOND INSULATING LAYER TO COVER A DATE LINE EXCEPT A FIRST PORTION OF A DRAIN ELECTRODE

This certificate supersedes the Certificate of Correction issued August 14, 2012.

Signed and Sealed this
Fourth Day of September, 2012

David J. Kappos
*Director of the United States Patent and Trademark Office*